(12) United States Patent
Ziatdinov et al.

(10) Patent No.: US 12,253,540 B2
(45) Date of Patent: Mar. 18, 2025

(54) MACHINE LEARNING-DRIVEN OPERATION OF INSTRUMENTATION WITH HUMAN IN THE LOOP

(71) Applicant: UT-Battelle, LLC, Oak Ridge, TN (US)

(72) Inventors: Maxim A Ziatdinov, Oak Ridge, TN (US); Kevin Roccapriore, Oak Ridge, TN (US); Yongtao Liu, Oak Ridge, TN (US); Kyle P. Kelley, Oak Ridge, TN (US); Rama K. Vasudevan, Oak Ridge, TN (US); Jacob D Hinkle, Oak Ridge, TN (US); Sergei V. Kalinin, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/655,038

(22) Filed: May 3, 2024

(65) Prior Publication Data
US 2024/0288467 A1   Aug. 29, 2024

Related U.S. Application Data

(63) Continuation of application No. 18/324,343, filed on May 26, 2023, now Pat. No. 11,982,684.

(60) Provisional application No. 63/346,425, filed on May 27, 2022.

(51) Int. Cl.
*G01Q 60/10* (2010.01)
*G02B 21/10* (2006.01)

(52) U.S. Cl.
CPC ............ *G01Q 60/10* (2013.01); *G02B 21/10* (2013.01)

(58) Field of Classification Search
CPC ........ G01Q 60/10; G01Q 30/04; G02B 21/10; G06N 3/047; G06N 3/09; G06N 7/01; G06V 10/764; G06V 10/774; G06V 10/82; G06V 20/69
See application file for complete search history.

(56) References Cited

U.S. PATENT DOCUMENTS 9,710,695 B2 * 7/2017 Xu .................... G06F 18/2414
2015/0169997 A1   6/2015 Weber et al.
(Continued)

OTHER PUBLICATIONS

Blei, D. et al., "Variational Inference: A Review for Statisticians", Journal of the American Statistical Association, 2017, pp. 859-877, vol. 112, No. 518.
(Continued)

*Primary Examiner* — Seung C Sohn
(74) *Attorney, Agent, or Firm* — Scully, Scott, Murphy & Presser, P.C.

(57) ABSTRACT

Systems are provided for machine learning-driven operation of instrumentation with human in the loop. The systems use a model with learnt model parameters to define points for physical-characteristic measurements once the model is trained. The systems use active learning, which considers selection, reinforcement and/or adjustment inputs from the instrumentation's user, to enable describing a relationship between local features of sample-surface structure shown in image patches and determined representations of physical-characteristic measurements.

12 Claims, 17 Drawing Sheets
(17 of 17 Drawing Sheet(s) Filed in Color)

(56) References Cited

U.S. PATENT DOCUMENTS

2019/0294905 A1    9/2019   Hirade et al.
2020/0372635 A1*  11/2020   Veidman .............. G06T 7/0012

OTHER PUBLICATIONS

Bosman, M. et al., "Mapping chemical and bonding information using multivariate analysis of electron energy-loss spectrum images", Ultramicroscopy, 2006, pp. 1024-1032, vol. 106.

Creange, N. et al., "Towards automating structural discovery in scanning transmission electron microscopy", Machine Learning: Science and Technology, 2022, pp. 1-13, vol. 3, No. 1.

Doty, C. et al., "Design of a graphical user interface for few-shot machine learning classification of electron microscopy data", Computational Materials Science, 2021, pp. 1-19.

Dyck, O. "A self-driving microscope and the Atomic Forge", MRS Bulletin, 2019, pp. 669-670, vol. 44.

Helminiak, D. et al., "Deep Learning Approach for Dynamic Sparse Sampling for High-Throughput Mass Spectrometry Imaging", IS&T Int Symp Electron Imaging, 2021, pp. 2901-2907.

Huang, B. et al. "Artificial Intelligent Atomic Force Microscope Enabled by Machine Learning", Nanoscale, 2018, pp. 21320-21326, vol. 10.

Jesse, S. et al., "Switching spectroscopy piezoresponse force microscopy of ferroelectric materials", Appl. Phys. Lett., 2006, pp. 062908-1 to 062908-3, vol. 88.

Jesse, S. et al., "Principal component and spatial correlation analysis of spectroscopic-imaging data in scanning probe microscopy", Nanotechnology, 2009, pp. 1-7, vol. 20.

Kalinin, S. et al., "Toward Decoding the Relationship between Domain Structure and Functionality in Ferroelectrics via Hidden Latent Variables", ACS Applied Materials & Interfaces, 2021, pp. 1-1693-1703, vol. 13.

Kalinin, S. et al., "Gaussian process analysis of electron energy loss spectroscopy data: multivariate reconstruction and kernel control", npj Comput Mater, 2021, pp. 1-10, vol. 7, No. 154.

Kalinin, S. et al., "Deep Bayesian local crystallography", npj Comput Mater, 2021, pp. 1-12, vol. 7, No. 181.

Kalinin, S. et al., "Automated and Autonomous Experiments in Electron and Scanning Probe Microscopy", ACS Nano, 2021, pp. 12604-12627, vol. 15, No. 8.

Kelley, K. et al., "Fast Scanning Probe Microscopy via Machine Learning: Non-rectangular scans with compressed sensing and Gaussian process optimization", Small, 2020, pp. 1-6, vol. 16.

Krull, A. et al., "Artificial-intelligence-driven scanning probe microscopy", Communications Physics., 2020, pp. 1-8, vol. 3, No. 54.

Liu, Y. et al., "Experimental discovery of structure-property relationships in ferroelectric materials via active learning", Nat Mach Intell, 2022, pp. 1-23.

Noack, M. et al., "Autonomous Materials Discovery Driven by Gaussian Process Regression with Inhomogeneous Measurement Noise and Anisotropic Kernels", Sci Rep., 2020, pp. 1-16, vol. 10.

Ovchinnikov, O. et al., "Adaptive probe trajectory scanning probe microscopy for multiresolution measurements of interface geometry", Nanotechnology, 2009, pp. 1-6, vol. 20, No. 257.

Pearl, J, "The seven tools of causal inference, with reflections on machine learning", Communications of the ACM, 2019, pp. 54-60, vol. 62, No. 3.

Shahriari, B. et al., "Taking the Human Out of the Loop: A Review of Bayesian Optimization", Proceedings of the IEEE, 2016, pp. 148-175, vol. 104, No. 1.

Shiga, M. et al., "Sparse modeling of EELS and EDX spectral imaging data by nonnegative matrix factorization", Ultramicroscopy, 2016, pp. 43-59, vol. 170.

Sotres, J. et al., "Enabling autonomous scanning probe microscopy imaging of single molecules with deep learning", Nanoscale, 2021, pp. 9193-9203, vol. 13.

Vasudevan, R. et al., "Autonomous Experiments in Scanning Probe Microscopy and Spectroscopy: Choosing Where to Explore Polarization Dynamics in Ferroelectrics", ACS Nano, 2021, pp. 11253-11262, vol. 15.

Wilson, A. et al., "Deep Kernel Learning", International Conference on Artificial Intelligence and Statistics, 2016, pp. 370-378, vol. 51.

Zhang, S. et al., "Evaluation of EELS spectrum imaging data by spectral components and factors from multivariate analysis", Microscopy, 2018, pp. i133-i141, vol. 67, No. S1.

Ziatdinov, M. et al., "Imaging mechanism for hyperspectral scanning probe microscopy via Gaussian process modelling", npj Comput Mater, 2020, pp. 1-7, vol. 6, No. 21.

\* cited by examiner

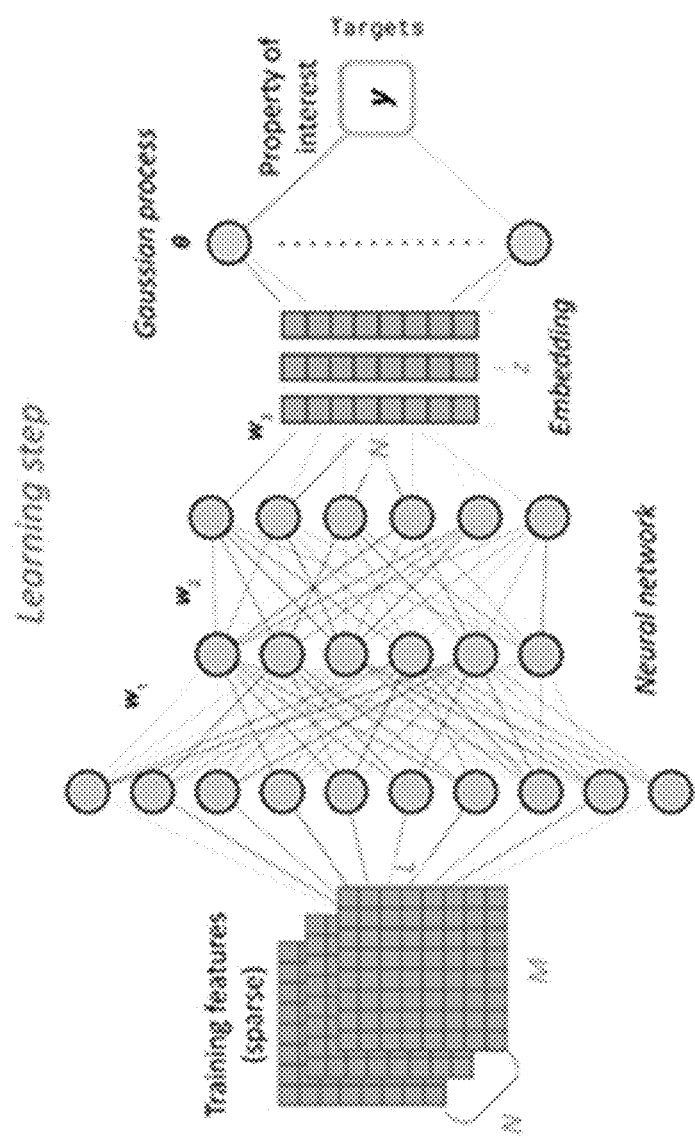

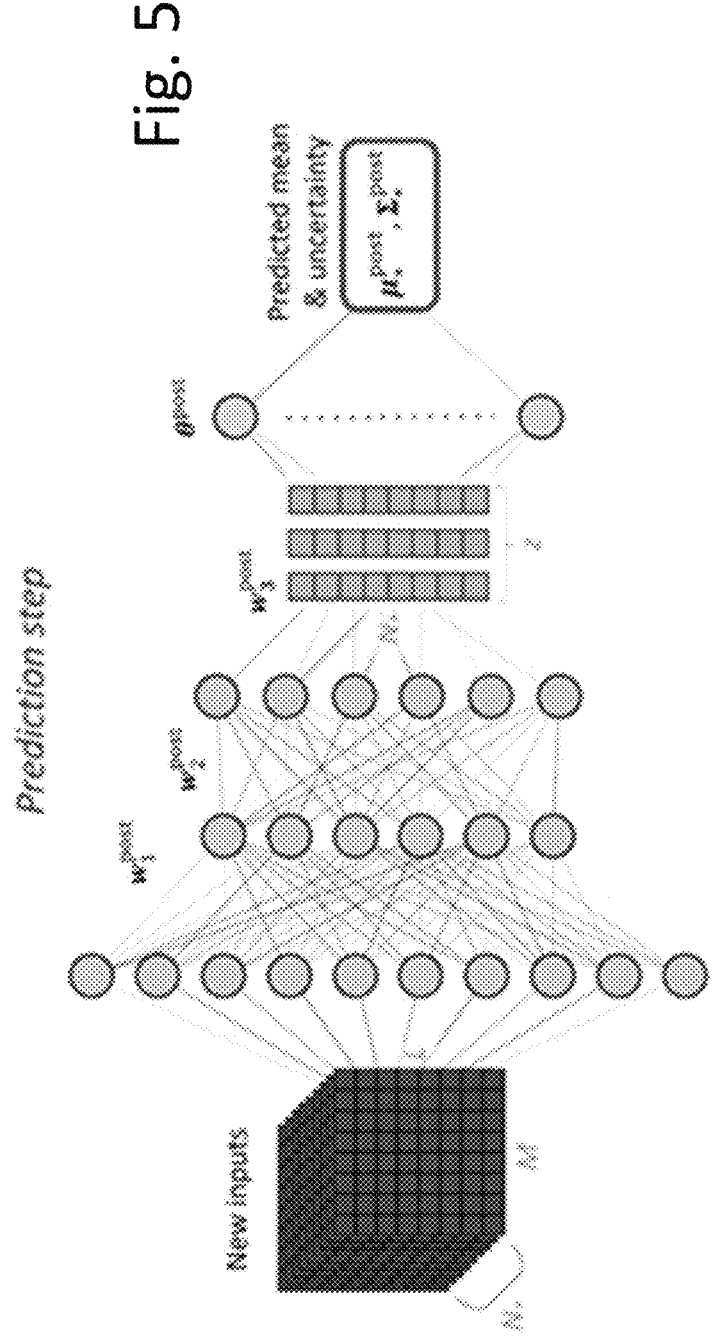

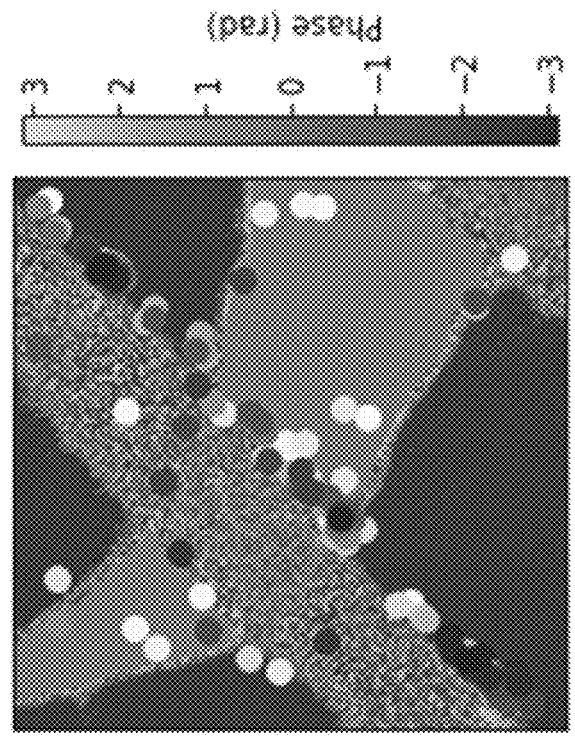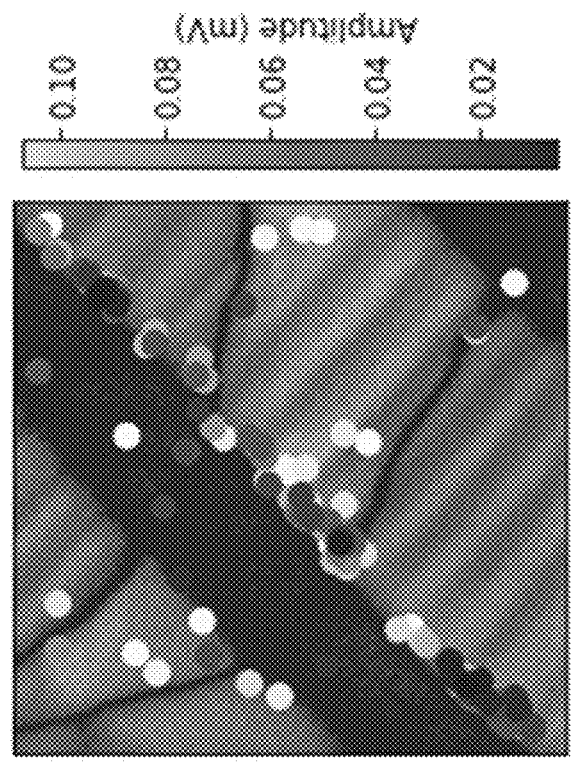
Fig. 11A

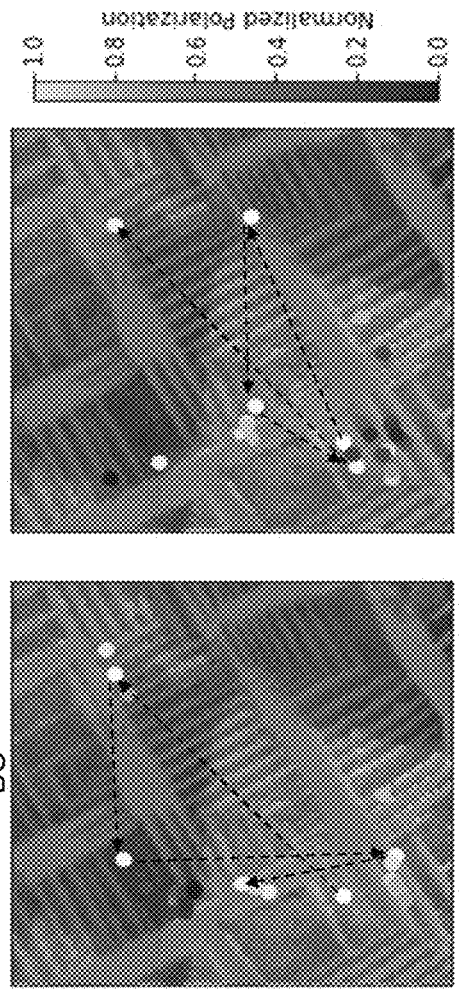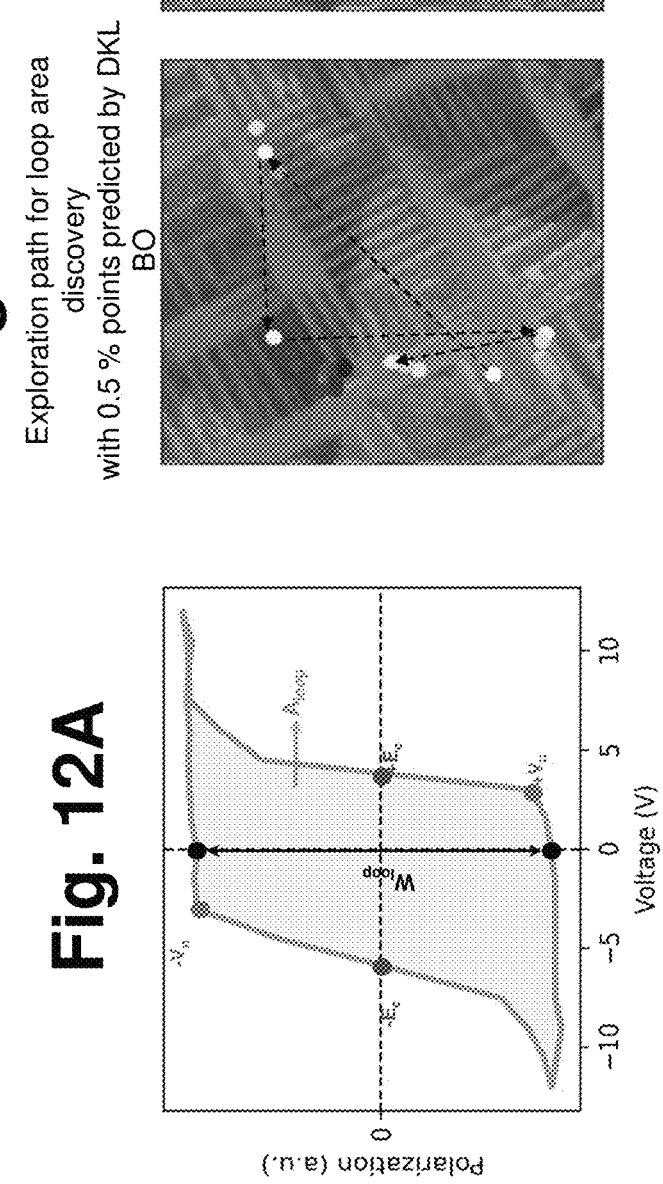
Fig. 12A
Fig. 12B Exploration path for loop area discovery with 0.5 % points predicted by DKL BO
Fig. 12C Exploration path for loop width discovery with 0.5 % points predicted by DKL BO

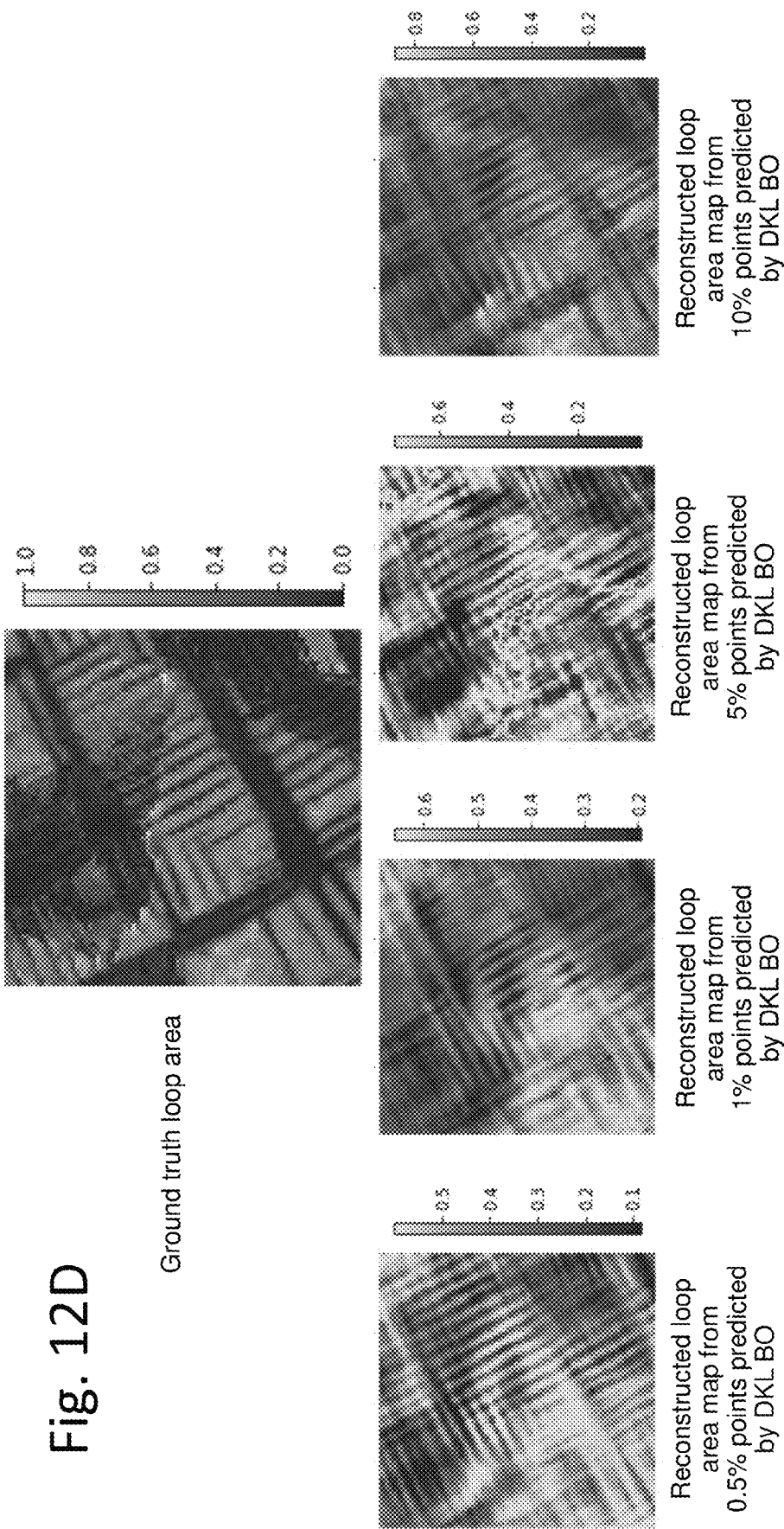

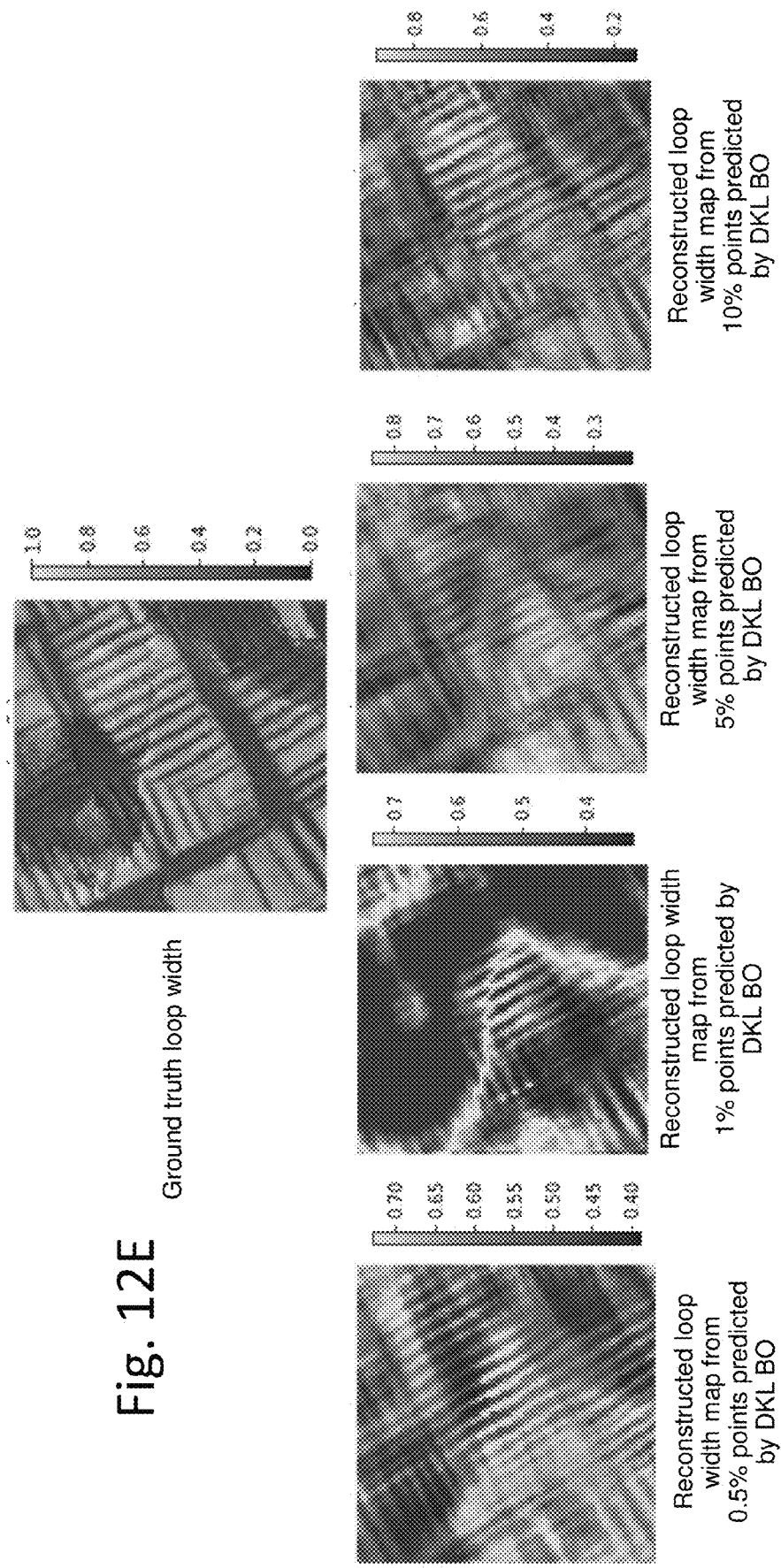

MACHINE LEARNING-DRIVEN OPERATION OF INSTRUMENTATION WITH HUMAN IN THE LOOP

CROSS-REFERENCE TO RELATED APPLICATIONS

This application is a continuation application of U.S. patent application Ser. No. 18/324,343 filed on May 26, 2023 which claims the benefit of U.S. Provisional Application No. 63/346,425, filed on May 27, 2022, which is incorporated by reference herein in its entirety.

STATEMENT REGARDING FEDERALLY SPONSORED RESEARCH OR DEVELOPMENT

This invention was made with Government support under DE-AC05-00OR22725 awarded by US Department of Energy and under DE-SC0021118 awarded by US Department of Energy. The Government has certain rights to this invention.

FIELD OF THE DISCLOSURE

The disclosure relates generally to computers, computer applications using machine learning for automating experiments in instrument systems.

BACKGROUND

Imaging techniques provide opportunities for exploring the physics and chemistry of mesoscale and atomic systems. For example, scanning probe microscopy techniques have become the workhorse of areas ranging from quantum science to physics of correlated systems, materials science, medicine, and biology. Similarly, mass-spectrometric and optical methods now underpin pharma, medicine, and biology. In electron microscopy, exploring the nature of electronic and superconductive order parameters in quantum materials, or probing vibrational and plasmonic properties on nanometer and atomic level are possible.

New instruments and imaging modalities have caused an exponential growth of the volumes of generated data by the instruments. However, merely collecting large volumes of data over a parameter space is not a goal of experiments, rather the goal is to understand or discover relationships or physical properties and cause thereof. This may or may not be based on prior knowledge or models. For example, in exploring properties of polycrystalline semiconductors, of interest are grain boundary regions, rather than the whole entirety of the surface. Similarly, in STM, very often the behaviors of interest are sought in specific regions of interest including adatoms and atomic-scale defects, step edges, or dislocations. In STEM/EELS, specific regions of interest can be edges of surface structures, corners, interfaces, topological defects, etc.

While collecting a large volume of data over a parameter space is sometimes possible, it is time consuming. Moreover, depending on the sample and the experiment, the act of collecting of the data may damage the sample. For example, when the sample contains biological material, exposing the sample to repeated energy may destroy the same.

Certain known instrument systems are based on a human operator paradigm. For example, the locations for the spectroscopic measurements are selected manually based on the perceived, e.g., by a human operator, interest of specific locations identified via features in a structural image. In other known instrument systems, measurements are run in spectroscopic grid modes, where spectral data is collected over a uniform sampling grid. These systems in turn necessitated development of linear and non-linear dimensionality reduction methods for analysis of such multidimensional data. However, these imaging modalities are characterized by significant disparities in acquisition times for spectroscopic and structural measurements. Correspondingly, the spatial density of the information is limited. While certain post-acquisition techniques have been developed, these techniques do not change the fundamental limitation of the spectroscopic imaging acquisition methods. Regions for detailed studies, be it high-resolution scans or spectral imaging, whether single measurement point or grid of points, are selected based on operator intuition, and data analysis is performed after, e.g., in some cases long after, it has been acquired.

SUMMARY

Accordingly, disclosed is a method for physically characterizing a surface of a sample. The sample surface has structure. The method may comprise obtaining an image formed by scanning the surface of the sample, producing M×N patches of the image corresponding to non-overlapping locations of the sample surface, obtaining respective measurements of a physical characteristic of the sample surface that were acquired at the sample-surface locations to which K of the M×N image patches correspond, where K<<M×N, determining a representation of each measurement, respectively, training a model to determine a relationship between local features of the sample-surface structure shown in the K image patches and the determined representations, predicting, based on the trained model, representations of physical-characteristic measurements to be acquired at the sample-surface locations to which the remaining (M×N−K) image patches correspond, and estimating respective prediction uncertainties, determining scores associated with the prediction, and selecting, based on the scores, one of the remaining image patches corresponding to a sample-surface location for acquiring the next physical-characteristic measurement, instructing an instrument to acquire the next physical-characteristic measurement at the sample-surface location to which the selected image patch corresponds, obtaining the next physical-characteristic measurement once it was acquired by the instrument as instructed and determining a representation thereof and using it in combination with the selected image patch for retraining the model. Each image patch may have m×n pixels and show the corresponding local features of the sample-surface structure. The training, predicting, determining scores, selecting, instructing, obtaining the next physical-characteristic measurement, subsequent determining of the representation and retraining may be iteratively performed until a training threshold is reached.

In an aspect of the disclosure, the training may comprise jointly determining a plurality of first model parameters and at least one second model parameter that define a physical-to-structural correlation between the image patches and the representations of the measurements. The plurality of first model parameters may be used to determine Z latent variables for each image patch, where Z<<m×n. The plurality of first model parameters and the at least one second model parameter may be initially determined from a first image patch of the K image patches and a corresponding representation of the measurement, and iteratively updated based on progressively larger subsets of the K image patches and their corresponding measurement representations. The first model parameters and the at least one second model parameter may be stored as model parameters for the trained model after all of the K image patches are processed.

In an aspect of the disclosure, the predicting of the representations, for each of the remaining (M×N−K) image patches, may use the stored plurality of first model parameters to predict the latent variables for the respective image patch and use the stored at least one second model parameter and the predicted latent variables to predict the corresponding representation.

In an aspect of the disclosure, the training threshold may be performance-based such as a decrease in a prediction uncertainty between iterations being at a rate below a predetermined rate. In other aspects, the training threshold may be a fixed number of iterations for the training and retraining such as a total number of measurements for both training and retraining exceeding a predetermined number $N_{Max}$. The predetermined number $N_{Max}$ may ensure that the sample is exposed, over $N_{Max}$ acquisitions, to a total irradiation that causes at most reversable changes to the sample. In some aspects, multiple training thresholds may be used.

In an aspect of the disclosure, when the predetermined number $N_{Max}$ is not reached and the training threshold has been reached for another reason, the method may further comprise instructing the instrument to acquire additional measurements using the trained model at certain remaining points and at a defined order determined from the trained model.

In an aspect of the disclosure, the K image patches may be randomly selected.

In an aspect of the disclosure, the representation may be a scalar value or a vector of the physical-characteristic measurement.

In an aspect of the disclosure, deep kernel learning including gaussian processes (GPS) may be used for training and retraining. The deep kernel learning may use a neural network with weights.

In an aspect of the disclosure, the scores may comprise at least one of predictive mean and uncertainty for the predicted representation for the (M×N−K) remaining image patches. The image patch may be selected for the next measurement based on either the maximum predictive mean or the maximum uncertainty. In other aspects, an acquisition function may be used to determine the scores and the image patch for the next physical-characteristic measurement.

In an aspect of the disclosure, both the image of the sample surface and the physical-characteristic measurements of the sample surface may be acquired on a same instrument. In other aspects, a different instrument may be used.

In an aspect of the disclosure, the instrument may be a scanning tunnelling microscope (STM), scanning probe microscope (SPM), scanning electron microscope (SEM), transmission electron microscope (TEM), scanning transmission electron microscope (STEM) or piezoresponse force microscope (PFM). For example, a STEM may acquire a high-angle annular dark-field (HAADF) image and the physical characteristic of the sample surface may be related to plasmon functionalities. The same instrument or another may acquire electron energy loss spectra (EELS) measurements and the representation of the EELS may be one of a ratio of a low-energy peak's amplitude to a high-energy peak's amplitude, or maximum amplitude of the high-energy peak. In other aspects, the physical characteristic of the sample surface may be related to one of electric field strength, charge density, or lattice strain. The same instrument (STEM) or another instrument may acquire 2D diffraction patterns, and the representation of the 2D diffraction patterns may be one of a x- or y-components of center of mass (CoM), CoM angle, or CoM magnitude. In another example, when the PFM is used, the surface image may be a PFM image and the physical characteristic of the sample surface may be related to interactions of ferroelectric and ferroelastic domain walls. The measurement may be hysteresis loops, and the representation of the hysteresis loops may be one of a hysteresis-loop width or a hysteresis-loop area.

In an aspect of the disclosure, the method may further comprise receiving, via a user interface, a definition of the physical-characteristic measurement and the representation of the measurement. In an aspect of the disclosure, the user may also define the acquisition function.

In an aspect of the disclosure, the sample-surface location to which an image patch corresponds may be at the center of the image patch.

Also disclosed is a system. The system may comprise a user interface, a memory, a communication interface, and a processor. The user interface may receive experiment parameters from a user. The experiment parameters may comprise at least a target physical characteristic measurement, a conversion of the target physical characteristic measurement into a representation and a training threshold. The experiment parameters may be stored in the memory. The communication interface may receive measurement data from a first instrument of the target physical characteristic measurement of a sample and image data of an image formed by scanning the surface of the sample from a second instrument. The processor may obtain the image data and store the image data in the memory, produce M×N patches of the image corresponding to non-overlapping locations of the sample surface from the image data, obtain respective measurements of a physical characteristic of the sample surface that were acquired at the sample-surface locations to which K of the M×N image patches correspond, where K<<M×N and store the respective measurements in memory in correspondence to the image patches, determine from the measurements and the user input conversion of the target physical characteristic measurement into a representation, representations of the measurements and store the representations in the memory, train a model to determine a relationship between local features of the sample-surface structure shown in the K image patches and the determined representations, predict, based on the trained model, representations of physical-characteristic measurements to be acquired at the sample-surface locations to which the remaining (M×N−K) image patches correspond, and estimate respective prediction uncertainties, determine, scores associated with the prediction, and select, based on the scores, one of the remaining image patches corresponding to a sample-surface location for acquiring the next physical-characteristic measurement, instruct the first instrument to acquire the next physical-characteristic measurement at the sample-surface location to which the selected image patch corresponds; and obtain the next physical-characteristic measurement from the first instrument and determine a representation thereof and store the next physical-characteristic measurement, the representation in association with the selected image patch. The processor may also retrain the model using the representation and the selected image patch. The processor may execute iteratively the training, predicting, the determining scores, instructing the first instrument to acquire the next physical-characteristic measurement, obtaining the next physical-characteristic measurement, and determining the representation thereof, and retraining. Each image patch may have m×n pixels and showing corresponding local features of the sample-surface structure.

In an aspect of the disclosure, to train, the processor may jointly determine a plurality of first model parameters and at least one second model parameter that define a physical-to-structural correlation between the image patches and the representations of the measurements. The plurality of first model parameters may be used to determine Z latent variables for each image patch, where Z<<m×n. The plurality of first model parameters and the at least one second model parameter may be initially determined by the processor from a first image patch of the K image patches and a corresponding representation of the measurement, and iteratively updated based on progressively larger subsets of the K image patches and their corresponding measurement representations. The processor may store the first model parameters and the at least one second model parameter as model parameters for the trained model after all of the K image patches are processed.

In an aspect of the disclosure, to predict, the processor may for each of the remaining (M×N−K) image patches, use the stored plurality of first model parameters to predict the latent variables for the respective image patch and use the stored at least one second model parameter and the predicted latent variables to predict the corresponding representation.

In an aspect of the disclosure, the processor may further determine whether the training threshold is reached. The training threshold may be performance-based such as a decrease in a prediction uncertainty between iterations being at a rate below a predetermined rate. In other aspects, the training threshold may be a fixed number if iterations for the training and retraining such as a total number of measurements for both training and retraining exceeding a predetermined number $N_{Max}$. The predetermined number $N_{Max}$ may ensure that the sample is exposed, over $N_{Max}$ acquisitions, to a total irradiation that causes at most reversable changes to the sample. In some aspects, multiple training thresholds may be used. When the training threshold is reached, the processor may determine whether a predetermined number $N_{Max}$ is reached and in response to determining that the predetermined number $N_{Max}$ is not reached, the processor may instruct the first instrument to acquire additional measurements using the trained model at certain remaining points and at a defined order determined from the trained model.

In an aspect of the disclosure, the first instrument and the second instrument may be the same. In other aspects, the first instrument and the second instrument may be different.

In an aspect of the disclosure, the system may further comprise the first instrument and the second instrument.

In an aspect of the disclosure, the first instrument and/or the second instrument may be a scanning tunnelling microscope (STM), scanning probe microscope (SPM), scanning electron microscope (SEM), transmission electron microscope (TEM), scanning transmission electron microscope (STEM) or piezoresponse force microscope (PFM). For example, the second instrument may be a STEM and the image may be a high-angle annular dark-field (HAADF) image. The physical characteristic of the sample surface may be related to plasmon functionalities. The first instrument may measure an electron energy loss spectra (EELS), and the representation of the EELS may be one of a ratio of a low-energy peak's amplitude to a high-energy peak's amplitude, or maximum amplitude of the high-energy peak. In other aspects, the physical characteristic of the sample surface may be related to one of electric field strength, charge density, or lattice strain, and the first instrument may measure 2D diffraction patterns, and the representation of the 2D diffraction patterns may be one of a x- or y-components of center of mass (CoM), CoM angle, or CoM magnitude. In another example, the second instrument may be the PFM and the surface image may be a PFM image. The physical characteristic of the sample surface may be related to interactions of ferroelectric and ferroelastic domain walls. The first instrument may measure hysteresis loops, and the representation of the hysteresis loops may be one of a hysteresis-loop width or a hysteresis-loop area.

In an aspect of the disclosure, the user interface may also receive a definition of the scores or a function to determine the scores. For example, the function may be an acquisition function such as an upper confident bound (UCB), probability of improvement (PI) or expected improvement (EI).

In other aspect, the user interface may receive a number of patches to divide the image and the number K and where the processor randomly selects the K image patches.

Also disclosed is a computer-readable recording medium having one or more modules of computer-readable instructions, the computer-readable instructions, when executed by a processor cause the processor to perform one or more aspects of the disclosure.

In an aspect of the disclosure, the computer readable instructions, when executed by a processor cause the processor to obtain image data of an image formed by scanning a surface of a sample from a first instrument and store the image data in the memory, produce M×N patches of the image corresponding to non-overlapping locations of the sample surface from the image data, each image patch having m×n pixels and showing corresponding local features of the sample-surface structure, obtain respective measurements of a physical characteristic of the sample surface that were acquired at the sample-surface locations to which K of the M×N image patches correspond, where K<<M×N, from a second instrument and store the respective measurements in memory in correspondence to the image patches, determine from the measurements, representations of the measurements and store the representations in the memory, train a model to determine a relationship between the local features of the sample-surface structure shown in the K image patches and the determined representations, predict, based on the trained model, representations of physical-characteristic measurements to be acquired at the sample-surface locations to which the remaining (M×N−K) image patches correspond, and estimate respective prediction uncertainties, determine, scores associated with the prediction, and select, based on the scores, one of the remaining image patches corresponding to a sample-surface location for acquiring the next physical-characteristic measurement, instruct the second instrument to acquire the next physical-characteristic measurement at the sample-surface location to which the selected image patch corresponds, and obtain the next physical-characteristic measurement from the second instrument and determine a representation thereof and store the next physical-characteristic measurement, the representation in association with the selected image patch. The computer readable instructions, when executed by a processor cause the processor to retrain the model using the representation and the selected image patch. The computer readable instructions, when executed by a processor cause the processor to iteratively perform the training, predicting, the determining scores, instructing the first instrument to acquire the next physical-characteristic measurement, obtaining the next physical-characteristic measurement, and determining the representation thereof, and retraining.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 illustrates an example of a training process for a neural network and gaussian processing in accordance with aspects of the disclosure;

FIG. 5 illustrates an example of a testing process for a neural network and gaussian processing in accordance with aspects of the disclosure;

FIG. 6A illustrates a structural HAADF image of a 2D section of suspended $MnPS_3$ and the scale bar in FIG. 6A is 50 nm; FIG. 6C and FIG. 6D illustrate autonomous optimizations of different representations where the representation in FIG. 6C is a peak ratio and in FIG. 6D is a maximum spectral intensity and FIG. 6B illustrates the average spectrum from all measured surface image patches (points) in the autonomous optimization in FIG. 6C, the corresponding acquisition function, prediction and uncertainty maps are shown in FIG. 6C and FIG. 6D, the arrows indicates the peaks from which a peak ratio is determined;

FIG. 7A shows a CoM magnitude as the representation and FIG. 7B shows a CoM angle as the representation;

FIG. 8A illustrates a Full HAADF image of a single layer graphene containing defects, selected local image patches from the HAADF image and corresponding ronchigrams and scaler representations: CoMx, CoMy, angle and magnitude and FIG. 8B illustrates Full HAADF image of a bilayer graphene containing defects, selected local image patches of the HAADF image and corresponding ronchigrams and scaler representations: CoMx, CoMy, angle and magnitude, where the "X" in the HAADF identified the patches;

FIGS. 10A-11B illustrate results of an automated PFM experiment in accordance with aspects of the disclosure, where FIG. 10A illustrates BEPFM amplitude and phase images used for generation of domain structure image patches which were used in discovery of on-field loop area where the measurement discovered points are labeled in the image, where FIG. 11A illustrates BEPFM amplitude and phase images used for generation of domain structure image patches which were used in discovery of off-field loop area where the measurement discovered points are labeled in the image, where FIG. 11B illustrates the prediction and uncertainty of the off-field loop area based on an acquired 200 hysteresis loops;

FIG. 12A illustrates an example of a hysteresis loop measurement and different potential representations (scalarized values);

FIG. 12B illustrates examples of a predicted image and sequences for the representation of loop area;

FIG. 12C illustrates examples of a predicted image and sequences for the representation of loop width, FIG. 12D illustrates a comparison between the ground truth and different predictions for the loop area from a different percentage of hysteresis loop acquisitions, 0.5%, 1%, 5% and 10%; and FIG. 12E illustrates a comparison between the ground truth and different predictions for the loop width from a different percentage of hysteresis loop acquisitions, 0.5%, 1%, 5% and 10%.

DETAILED DESCRIPTION

Aspects of the disclosure, provide systems, methods, and programs, including machine learning with active learning, which can determine the relationship between structure in an optical image and representation(s) of a measurement(s) of a target physical property of interest. One or more models may be used to define the relationships. For example, one model may be used to generate local feature descriptors such as embeddings or latent variables for patches of an optical image and a second model may be used to define a relationship between the generated local feature descriptor(s) such as the embeddings or latent variables and the representation(s).

Model parameters are actively updated. Once the model parameters are finalized, the model(s) may be deployed to define next-measurement points in a parameter space. In some aspects, the parameter space include coordinates from an optical image space such as x and y coordinates.

Figure 1A:
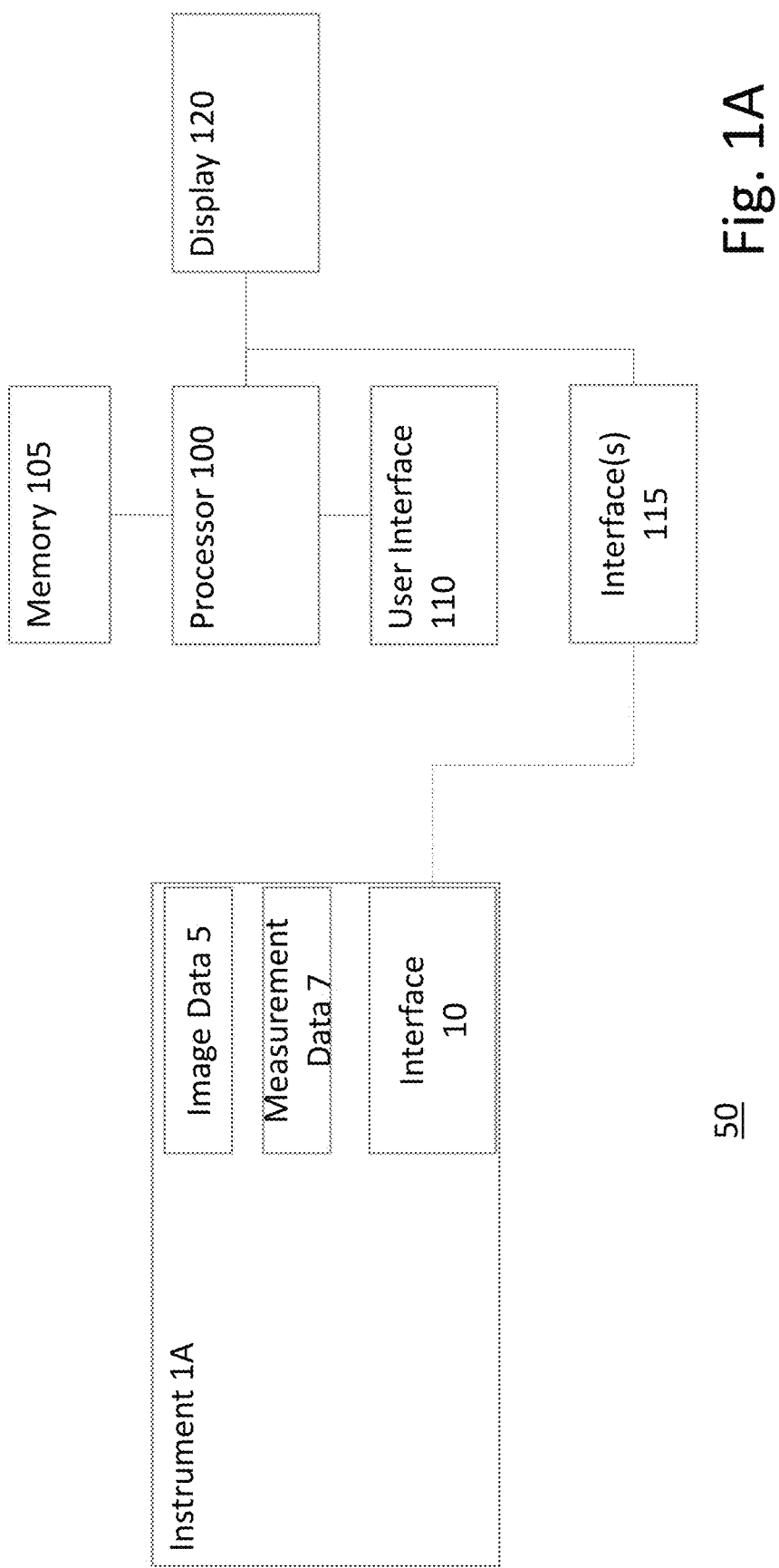
FIG. 1A illustrates an example of an instrument system in accordance with aspects of the disclosure.
Figure 1B:
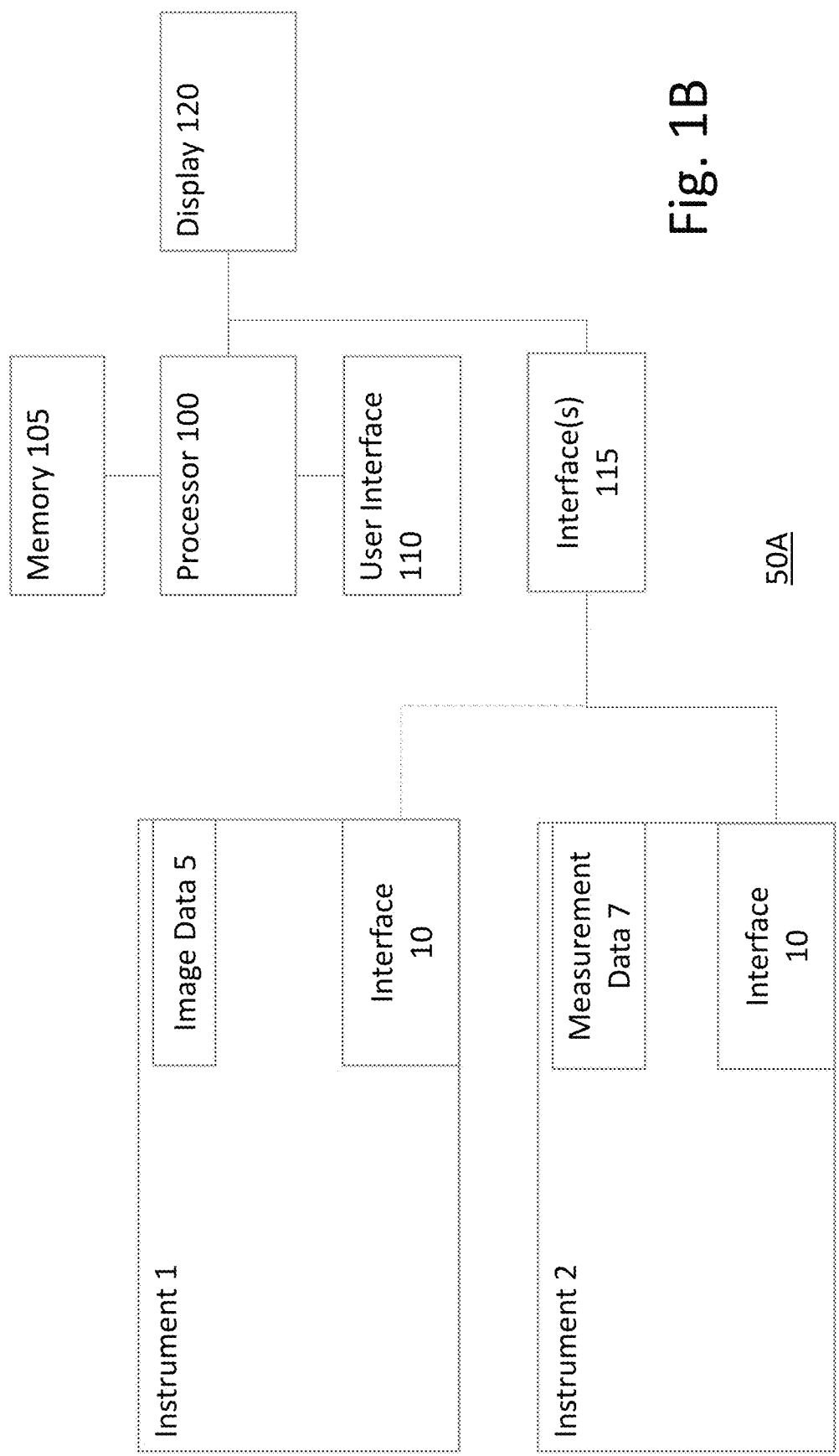
FIG. 1B illustrates an example of an instrument system in accordance with aspects of the disclosure.

In some aspects, the same instrument 1A may be used to generate both the optical image (image data 5) and acquire measurements of a target physical property of interest (measurement data 7) such as shown in FIG. 1A. In other aspects, a first instrument 1 may be used to acquire the optical image (image data 5) and a second instrument 2 may be used to acquire the measurement (e.g., spectral data) (measurement data 7) such as shown in FIG. 1B.

The components of the automated experiment system 50, 50A may also be used to determine the model parameters and deploy the final model in an automated experiment.

FIG. 1A is a diagram of an automated experiment system 50 in accordance with aspects of the disclosure. The automated experiment system 50 includes an instrument 1A. Instrument 1A may be used to generate the optical image (image data 5) and measurement data 7 such as a spectral image (measurements). The instrument 1A may include any optical microscope that is able to generate high information density images (high spatial-low spectral images). For example, the instrument 1A may provide an annular dark field (ADF) image such as a high angle annular dark field (HAADF), scanning probe microscope (SPM) such as a scanning force microscope (SFM) include atomic force microscope (ATM). The atomic force microscopy may have an infra-red mode (IR) or mass spectrometry mode (MS). In other aspects, the instrument 1A may be a band excitation piezoresponse microscope (PFM) (BEPFM) or a scanning transmission electron microscope (STEM). The microscope is not limited to the above examples, and may also include scanning tunneling microscope (STM), SEM-EL (cathodoluminescence), etc.

The microscope may be in a surface topography mode such as in contact, intermittent contact, or non-contact.

The instrument 1A may also provide spectral images such as electron energy loss spectroscopy (EELS), energy dispersive x-ray spectroscopy (EDX), time-of-fight second ion mass spectrometry (ToF-SIMS), band excitation piezoresponse spectroscopy (BEPS)

The instrument 1A may include light source(s), optics, mirrors, light scanning device (gimbals), cantilevers, etc. to obtain image(s). The instrument 1A may also comprise a sample holder. The specific components of the instrument 1A may be based on the type of image acquired.

When the same instrument 1A is used to acquire both the optical image and measurements such as spectral, the optical image may be acquired first.

The optical image may be acquired in a single shot. In other aspects, the optical image may be acquired by scanning on a pixel-basis (x and y). The image (such as each pixel) may be acquired at a first pixel dwell time.

Where a different instrument 1 (optical instrument) or instrument 2 (spectral or other analytical measurement device) is used to acquire the optical image and measurements (such as spectral), a co-registration of the information from the machines may occur. For example, a fiducial marker may be used on a preset location on the sample to co-register the coordinate systems. This is done to confirm that a certain structural image patch (also referred to as surface image patch, structure image path and local image patch) corresponds to an acquired measurement. In other aspects, a native feature in the sample may be used to co-register the data, e.g., a feature which looks the same in the different imaging modes. Co-registration may also occur with the same instrument 1A.

The instrument 1A (or individual instruments 1 and 2) may also comprise an on-board processor and memory. For example, the processor may control the light source(s) and the sample scanning such as via the gimbal(s) or moving the sample. The memory may store both the image data 5 (e.g., optical) and the measurement data 7 (e.g., spectral, or other analytical measurement) when the same instrument 1A acquires both or the memory in instrument 1 may store the image data 5 and the memory in instrument 2 may store the measurement data 7.

The instrument 1A (or individual instruments 1 and 2) may also comprise an interface 10. This interface 10 may be a communication interface such as a USB port. In an aspect of the disclosure, the interface 10 may be a wireless or wired network interface. A data acquisition card (DAQ) such as from National Instruments may be connected to the interface 10.

The system 50 or 50A may also comprise a processor 100. The processor 100 may be one or more central processing unit(s) CPUs. The processor may also be one or more graphics processing unit(s) GPUs. For example, the GPU may be used for training and testing where the data set may become large. The GPU may perform the training/testing in less time than a CPU. In other aspects of the disclosure, the processor 100 may be a microcontroller or microprocessor or any other processing hardware such as a field programmable gate array (FPGA) or an application specific integrated circuit (ASIC). In an aspect of the disclosure, the processor 100 may be configured to execute one or more programs stored in a memory 105 to execute the functionality described herein. The memory 105 can be, for example, RAM, persistent storage, or removable storage. The memory 105 may be any piece of hardware that is capable of storing information, such as, for example without limitation, data, programs, instructions, program code, and/or other suitable information, either on a temporary basis and/or a permanent basis. One CPU or GPU may execute the functionality described herein or multiple CPUs or GPUs may collectively execute the functionality described herein. For example, a GPU may be used to learn the relationships (model parameters), training and testing and a CPU may be used subsequently for completing the automated experiment.

In some aspects of the disclosure, the memory 105 may contain a Lab View program or framework (such as from National Instruments).

The processor 100 may be connected to the instrument 1A (or individual instruments 1 and 2) via an interface 115 and the DAQ. One of the interfaces may also be a USB to connect the DAQ.

The system 50 or 50A may also comprise a user interface 110. The user interface 110 may be any type of interface to interact with the processor 100 such as a keyboard, a mouse or a touch screen superposed on the display 120. The user interface 110 may be used to input experimental criteria or parameters into the system such as number of seed points, a particular seed point (if not random), target measurement (such as spectral measurements, diffraction patterns), define the parameter space, define the representation of the measurement(s), define the initial model parameters (if needed), acquisition function, training stopping criterion, policy of determining a balance of exploration and exploitations in an acquisition function etc. The user interface 110 may be remote from the processor 100. For example, the user interface 110 may be in a terminal such as a portable terminal like a mobile telephone or a laptop. The processor 100 may be installed as part of a server system. The user interface 110 may be displayed via a web browser or be part of an application installable on the terminal. The display 120 may also be remote from the processor 100 such as installed in the same terminal as the user interface 110.

The target measurement for a PFM may be a hysteresis loop and the representations may be the properties reflected in the polarization-electric hysteresis loops, e.g., hysteresis loop area, loop width, loop centroid, coercive field, nucleation bias, etc. The hysteresis loop area or loop width reflects the strength of polarization, which may be different in on-plane a domain, out-of-plane c domains, and domain walls.

In a 4D STEM, the target measurements may be 2D diffraction patterns. The representations may include electric field strength, local charge density, and lattice parameter variations which may be calculated from diffraction patterns obtained at different beam convergence angles. The goal may be to determine a maximum scalar electric field strength or maximum deviation of lattice parameter, which identifies high local charge density or high degree of strain, respectively. Strain and other crystal details (crystallographic relationships) may be extracted from nanobeam electron diffraction (NBED) by selecting a small convergence angle.

In electron energy low spectrum (EELS), the target measurements may be a spectrum which may be used to determine intensity of an edge and corner plasmon peaks.

In other aspects, the user may define the acquisition function via the user interface 110. The acquisition function may be an upper confidence bound (UCB), probability of improvement (PI) or expected improvement (EI), for example. The equation for EI is shown herein.

The user interface 110 enables an automated scientist—with human in the loop.

In some aspects of the disclosure, the user may select one machine learning technique from among a list of available machine learning techniques to actively learn the relationships. In some aspects of the disclosure, one of the machine learning techniques may be deep kernel learning with a GP (DKL). A neural network may be used to determine latent variables (embeddings) for surface image patches in the optical image. A gaussian processing GP Kernel may operate on the output of the neural network (as the base) to learn the relationship.

However, other machine learning techniques may be used, such as random forest and ensembles of deep neural networks.

Figure 2:
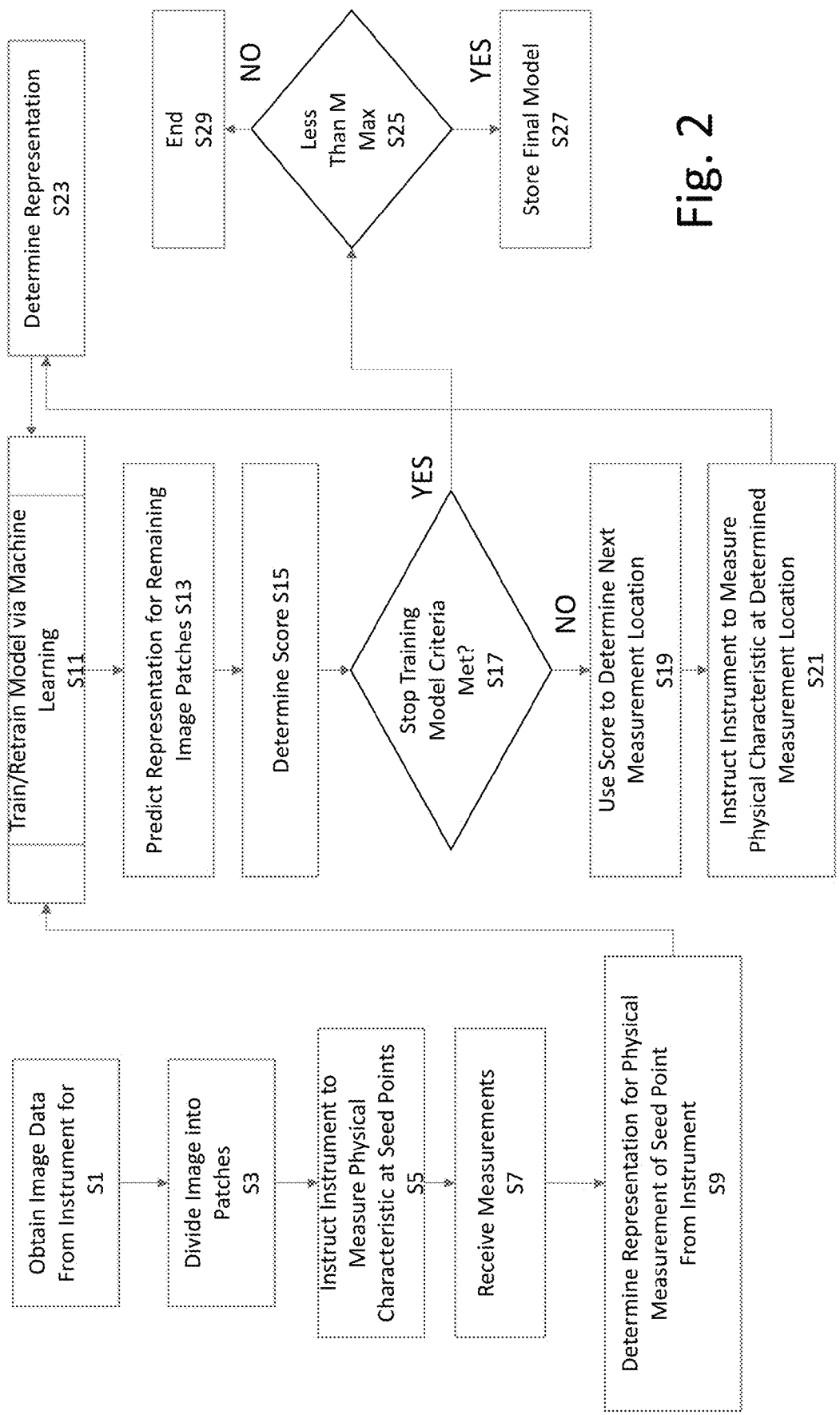
FIGS. 2 and 3 illustrate an automated experiment method in accordance with aspects of the disclosure.
Figure 3:
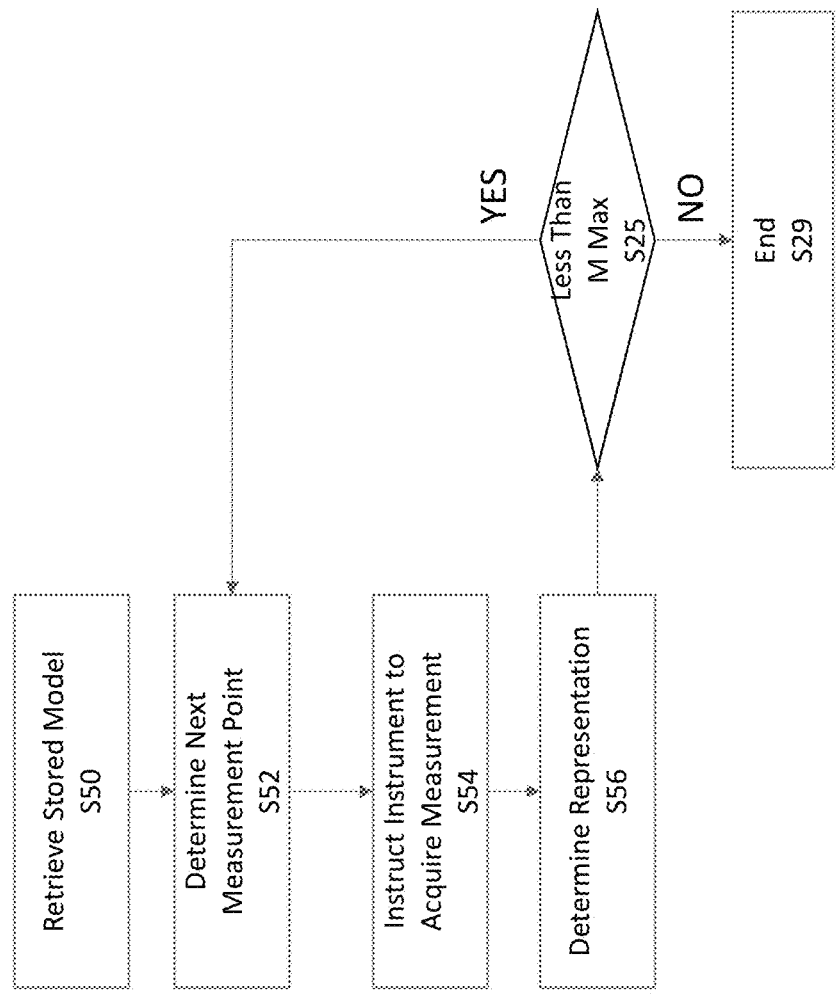

FIGS. 2 and 3 illustrate an automated experiment method in accordance with aspects of the disclosure. FIG. 2 depicts training and testing a model and FIG. 3 illustrates a method of using the defined model (from the training and testing) to complete the automated experiment to determine additional measurement points (also referred to as acquisition points) in the parameter space.

At S1, the processor 100 causes an instrument (either 1A or 1) to obtain an optical image of the sample. For example, the processor 100 issues an instruction via the interface 115, 10 to acquire the optical image such as a HAADF image. The instrument 1A or 1 in response to receiving the instruction acquires the optical image. For example, the instrument 1A or 1 scans a laser across the sample (raster scan). In other aspects, the instruments 1A or 1 acts a camera as takes a single picture. The instrument 1A or 1 has a preset pixel resolution for the image A×B. The instruments 1A or 1 stores the image data 5 locally. In an aspect of the disclosure, the instrument 1A or 1 transmits the image data 5 to the processor 100 (via interfaces 10 and 115 including the DAQ card). The processor 100 stores the received image data 5 in memory 105.

At S3, the processor 100 divides the received image into surface image patches. In an aspect of the disclosure, each surface image patch may be the same size, e.g., equal number of pixels. In some aspects, there may be M×N surface image patches. Each surface image patch may have m×n pixels. By dividing the image into smaller surface image patches, local geometry is able to be captured. In some aspects, the size of the local image patch may be a single pixel.

At S5, the processor 100 instructs the instrument 1A or 2 to acquire a measurement at seed points for the training of the model. In some aspects of the disclosure, the number of seeds points may be less than a hand full. For example, the number of seeds points may be three. In an aspect of the disclosure, the specific seed points within the parameter space may be randomly set. The parameter spaces include the patches (e.g., local regions in the image) (x and y coordinate). The parameter space may be a multi-dimensional parameter space and include other parameters (in addition to the position). In other aspects, the seed points may be uniformly spaced within the parameter space. In other aspects, the user may select the seed points (and number thereof). For example, the optical image may be displayed on the display 120 and the user may select the seed points based on viewing the optical image.

A processor (such as an FPGA) within the instrument 1A or 2 receives this instruction and executes the measurement(s) such as a spectra measurement or other measurements. The dwell time for a pixel for a spectral measurement such as EELS is 3 or 4 orders of magnitude longer than the first dwell time for the optical image. The instruction is sent via the DAQ and respective interfaces 115, 10. Where the surface image patch is multiple pixels, the measurement (such as spectra measurement) is made at the center of the surface image patch. The center of the surface image patch is with respect to the spatial resolution of the instrument 1A or 2 for spectral measurement. The measured data 7 from each seed point is sent back to the processor 100 via the DAQ and the respective interfaces, 115, 10 (received at S7).

At this point, the model has not been trained and therefore, the model does not know any relationship between the surface image patch and the measurement.

At S9, the processor 100 determines the representation for the measurement from each seed point using a user defined conversion as described above. The representation may be a scaler value of the measurement. For example, where the measurement is a hysteresis loop, the representation may be an area of the loop, a width of the loop, a peak etc. In other aspects, the representation may be a maximum spectral intensity of a selected spectral value. In other aspects, the representation may be a weighted sum of scalar values. In other aspects, the representation may be a vector representation of the measurement. When the representation is a vector, the different function outputs, such as response function values at different energies, may be independent or correlated. Correlation between different function outputs may be achieved by forcing them to share the same latent space.

In other aspects of the disclosure, the representation may be a statistical descriptor of the measurement. For example, the statistical descriptor may be obtained through a multivariate statistical analysis of the measurement data. The measurement data 7 may be spectral information with many spectral channels of data.

In some aspects, the analysis may include principal component analysis (PCA) or a non-negative matrix factorization (NMF) or other dimensional reduction method. For example, the representation may be a first component (or components) of the PCA. The representation may also be one of the components of the NMF.

Since the optical image and the spectral image may be obtained in different instruments, prior to inputting into the model for training at S11, the data is co-registered to confirm that the spectral image data is for the appropriate surface image patch. In some aspects, the optical image or the spectral image data may need to be rotated or translated to align.

At S11, the processor 100 trains the model(s) using the representations of the measured data and corresponding surface image patches. The following description of the training process is for DKL. However, as noted above, other models may be used. The combination of the neural network and GP kernel jointly determines the model weights (for the neural network) and the hyperparameter(s) (for the GP kernel).

A Gaussian process model, a type of probabilistic model over real-valued functions that may be defined as a collection of random variables indexed by independent variable x:

$$y \sim MultivariateNormal(0, K(x, x, \sigma, l)) \quad (1)$$

where x denotes the independent variable and K denotes a function that computes a kernel matrix such that $K_{ij}=k(x_i, x_j)$ for the kernel hyperparameters.

The hyperparameter θ may be defined as:

$$\theta = \{\sigma, l\} \quad (2)$$

$$\text{where } \sigma \sim LogNormal(0, s_1^{const}) \quad (3)$$

$$l \sim LogNormal(0, s_2^{const}) \quad (4)$$

A regular kernel K may be substituted by deep kernel learning to define a joint model, e.g., DKL with GP or DKL with Bayesian optimization (BO).

The joint model may be referred to as $$k_{DKL}(x, x' \mid w, \theta) = k_{base}(g(x \mid w), g(x' \mid w) \mid \theta) \quad (5)$$

where w are the weights of the neural network and Θ is a hyperparameter of the GP kernel. The latent variables (embeddings) in DKL are z=g(x|w) and z'=g(x'|w) and x, x' are structural identifiers.

The weights w of the neural network defines latent variables (and structural identifiers) for the surface image patches. Each surface image patch is reduced to a fixed number of latent variables to reduce or convert high-dimensional input data (image patches) into a set of low-dimensional values which the GP kernel operates.

In some aspects, each surface image patch is reduced to three latent variables. The number of latent variables may change based on the number of pixels in a surface image patch or number of surface image patches divided from the optical image and the number is not limited to three.

The neural network may comprise a plurality of layers, each having the weights.

The parameters of neural network and GP base kernel may be learned simultaneously by maximizing the model evidence via a stochastic variational inference also referred to herein as log marginal likelihood. In other aspects of the disclosure, the GP kernel may be trained using a Markov Chain Monte Carlo algorithm to get posterior samples for the model parameters.

In the training, the weights w, and hyperparameter Θ, may be iteratively determined and updated based on different sets of surface image patches and representations. For example, for a first surface image patch and corresponding representations, the weights w, hyperparameter Θ are defined to an initial value and thus, the latent variables (including structural identifiers) for the first surface image patch are also initially defined. When a second surface image patch and corresponding representation is added (first and second surface image patch and corresponding representations are used), the weights w, hyperparameter Θ are updated based on the new patch/corresponding representation(s). Thus, latent variables are also updated. This process is repeated for each seed surface image patch and representation, e.g., updated each iteration.

In other aspects, all of the seed patches/representations are collectively processed to determine the weights w, hyperparameter Θ (model parameters).

As described above, the representations may be vectors with multiple outputs. In an aspect of the disclosure, the additional correlation between function outputs may be induced via a shared covariance function defined as $$k([z, l], [z', l']) = k_l(l, l')k_z(z, z'), \quad (6)$$

where $k_l$ and $k_z$ represent the correlation between outputs and a standard covariance function operating on the latent space inputs, respectively.

The former is expressed as:

$$k(l, l') = (BB^T + \text{diag}(\tau))_{l,l'} \quad (7)$$

where B is a low-rank matrix and τ is a non-negative vector.

In other aspects, independence may be assumed between components of the vector, which would require training an independent neural network for each GP kernel, e.g., for each output. For a single-objective active learning, the vector-valued prediction of the model, may be scalarized in order to select the next measurement point. For multi-objective active learning, in an aspect of the disclosure, a Pareto front seeking to discover points offering an optimal balance between target functionalities may be used.

At S13, once the initial model parameters, e.g., the weights w, hyperparameter Θ (model parameters) are determined, the processor 100 predicts the representations for the remaining surface image patches (as test data). For example, the processor 100 uses the weights w to determine the latent variables for each remaining surface image patch and then uses the latent variables and hyperparameter Θ to predict the representations (y) such as by using EQ. 5.

At S15, the processor 100 evaluates the prediction(s) for the model. In some aspects, the evaluation includes determining predictive mean and variance. A prediction uncertainty is encoded in the variance. The predictive mean may be determined by:

$$\mu_\theta^{post} = K(x_*, x \mid \theta) K(x, x \mid \theta)^{-1} y \quad (8)$$

The variance may be determined by:

$$\sum_{,\theta}^{post} = K(x_*, x_* \mid \theta) - K(x_*, x \mid \theta) K(x, x \mid \theta)^{-1} K(x, x_* \mid \theta) \quad (9)$$

where x holds the independent variable for previous measurements (observations) and $x_*$ is the independent variable for the not-yet-measured points.

A score may be generated based on the predictive mean and variance (or another value determined from the same) such as a value determined from a function of combining the predictive mean and variance or the scores may be generated based on an acquisition function as described herein.

After the seed points are processed (or after each subsequent iteration), at S17 the processor 100 determines whether a stopping criterion (training threshold) has been met for stopping the training/testing. The stopping criterion may be a user defined criterion, input via user interface 110 prior to the experiment. The user defined criteria may be a fixed number of total measurements ($M_{max}$). $M_{max}$ may be based on the type of instrument and/or measurement. For example, $M_{max}$ may be based on the time required to acquire a single measurement. Different machines and/or measurements of spectral data may take different amounts of time. Thus, the stopping criterion may account for the amount of time per measurement. Additionally, certain samples, such as biological samples, may be damaged by energy from the measurements. The $M_{max}$ may account for the magnitude of the energy used to acquire measurements at each point and the sample type. For example, $M_{max}$ for biological samples may be less than other types of samples.

The stopping criterion may also be based on performance metrics. For example, the stopping criterion may be based on the improvement between the subsequent iterations. In an aspect of the disclosure, the processor 100 may use the total prediction uncertainty between iterations to analyze the improvement. For example, an improvement threshold may be used such as a change in percentage over P number of iterations. If the differences in the total prediction uncertainty is less than a threshold percentage, the condition may be satisfied. This avoids an infinite loop or processing where the total improvement is negligible. For example, the stopping criterion may be the prediction uncertainty between successive iterations asymptotically reaches zero (or near zero).

In some aspects of the disclosure, the stopping criterion may be an absolute uncertainty rather than a change between successive iterations.

In aspects of the disclosure, multiple stopping criteria may be used. For example, one criterion may be performance based (such as at S17) and another criterion may be absolute such as a fixed number of iterations (such as at S25).

If the processor 100 determines at S17 that the stopping criterion(ia) are not met ("NO" at S17), the processor 100 determines the next-measurement location within the parameter space at S19.

In an aspect of the disclosure, this determination may be based on user selected acquisition function.

The specific acquisition function may be user-based such as input via the user interface 110. For example, the acquisition function may be an expected improvement. For example, the (EI) may be determined by:

$$\alpha_{EI} = (\mu(x) - y^+ - \xi)\Phi\left(\frac{\mu(x) - y^+ - \xi}{\sigma(x)}\right) + \sigma(x)\phi\left(\frac{\mu(x) - y^+ - \xi}{\sigma(x)}\right) \quad (10)$$

where $\Phi$ is a standard normal cumulative distribution function, $y^+$ is the best predicted value (from the seed points or the current iteration), $\phi$ is the standard normal probability density function, $\sigma(x)$ is a standard deviation (a square root of the predictive variance) and $\xi$ balances the exploration and exploitation. In an aspect of the disclosure, $\xi$ may also be a user defined parameter. For example, $\xi$ may be set to 0.01. 0.01 is presented only for descriptive purposes and the value of $\xi$ is not limited to the example. In a purely exploratory mode, the location for the next measurement may be chosen to minimize the uncertainty.

Other acquisition functions may be used such as, UCB or PI. The use of a prediction-based acquisition function to determine the next-measurement point in the parameter space enables the model to be trained in a minimal number of iterations (e.g., reaching the performance-based stopping criterion quicker than if the acquisition function was not used).

In other aspects, the processor 100 may determine the next measurement point directly based on an uncertainty map. In some aspects of the disclosure, the processor 100 may determine the next measurement point based on the maximum uncertainty point (of the remaining points) in the parameter space (i.e., the "scores" described above). In other aspects of the disclosure, the processor 100 may use the predictive mean to determine the next measurement point (i.e., the "scores" described above).

At S21, the processor 100 issues an instruction to the instrument 1A or 2 to obtain a measurement at the new measurement point (corresponding to a selected surface image patch). The instruction is sent via the DAQ and respective interfaces 115, 10. In other aspects, the processor 100 may display the new measurement point on the display 120 as a notification of the new measurement point.

In response to the receipt of the instruction by the instrument 1A or 2, the instrument 1A or 2 acquires the instructed measurement at the specified point in the parameter space, e.g., corresponding to surface image patch. The instructed measurement may be a spectral image measurement (or other measurement).

The measurement data 7 is subsequently received from the instrument 1A or 2 via the interfaces 115, 10. At S23, the processor 100 repeats the determination of the representation of the measurement, e.g., scalarize or vector generation, based on the user defined conversion.

At S11, the processor 100 retrains the model(s) based on the newly acquired measurement (representation) and corresponding surface image patch. The processor 100 retrieves the stored weights w and hyperparameter $\Theta$ and updates the same based on all prior representations (including the current measurement/representation) and surface image patches. S13, S15 and S17 are repeated for each new representation (measurement) and if the stopping criterion is not met at S17, S19, S21 and S23 are also repeated. After each iteration, the model parameters weights w and hyperparameter $\Theta$ are stored in memory 105.

When the stopping criterion (ia) is met at S17, the processor 100 determines whether the stopping criterion (ia) is the fixed maximum number of iterations ($M_{max}$) at S25. When the fixed maximum number of iterations ($M_{max}$) is reached ("NO at S25), the process ends at S29, otherwise the training and testing of the model is finished and the model parameters weights w and hyperparameter $\Theta$ are finalized at S27 (stored as the final model parameters).

FIG. 4 illustrates an example of the training process (learning step) in accordance with aspects of the disclosure. Each surface image patch comprises multiple pixels (e.g., 8×8) referred as M×L in FIG. 4 (and in FIG. 5). The number of surface image patches for the training in the example is N. As shown, the neural network has three layers and weights $w_1$, $w_2$, $w_3$. These weights are iteratively determined. The result of the training is z embeddings (referred to above as latent variables). As shown, there are three defined sets of embeddings. Each set comprises the embedding for the N different surface image patches, e.g., N=8. As shown, the weights are iteratively determined (e.g., 8 iterations for increased number of sets of surface image patches at a time). As shown in FIG. 4, the targets (e.g., representations) are "y" (also referenced in FIG. 4 as "property of interest"). The hyperparameter $\Theta$ is shown below the label "gaussian process" (GP). The dots in the GP represent the different embeddings to "y"s. In accordance with aspects of the disclosure, each iteration may include the training (learning step) and testing (prediction step see, e.g., FIG. 5). The targets "y" corresponds to scalarized or vector representations. In this example, the targets may be scalarized diffraction patterns acquired from a center coordinate of the surface image patches such as a center of mass and virtual aperture transformation. Thus, here the measurements may be a diffraction pattern and the representations are calculated values from the different diffraction patterns.

FIG. 5 illustrates an example of the testing process (prediction step) in accordance with aspects of the disclosure. In FIG. 5, the new inputs refer to the remaining surface image patches $N_*$ generated in S3. The weights from the most recent iteration of the training are identified as $w_1^{post}$, $w_2^{post}$, $w_3^{post}$ (posterior weights). Each set of embeddings has $N_*$ values (one for each surface image patch). As shown, there are three defined sets of embeddings. There are predicted embeddings for each remaining surface image patch. The embeddings for each surface image patch may be different. The same weights $w_1^{post}$, $w_2^{post}$, $w_3^{post}$ are used to predict the embeddings for each of the remaining surface image patches. The hyperparameter $\Theta^{post}$ is shown below the label "gaussian process" (GP) and is the hyperparameter from the most recent iteration of the training.

$w_1^{post}$, $w_2^{post}$, $w_3^{post}$ and $\Theta^{post}$ collectively are the trained model parameters.

The testing predicts the "y" value (target representation) from the predicted embedding associated with each of the remaining surface image patches (not shown in FIG. 5) and the predicted mean and predicted uncertainty: $\mu^{post}$, $\Sigma^{post}$. The same $\Theta^{post}$ is used to predict the "y" values from each remaining surface image patches.

FIG. 3 illustrates an automated experiment using a model in accordance with aspects of the disclosure. In FIG. 3, the model has been trained in accordance with FIG. 2 and the training is stopped at S17 based on a performance-based stopping condition as opposed to reaching a maximum number of iterations ($M_{max}$) ("YES at S25"). When $M_{max}$ is reached ("NO" at S25), the automated experiment is done. Otherwise, additional measurements may be performed in the automated experiment ("YES" at S25). The number of additional measurements equals $M_{max}-M_{Training}$. $M_{Training}$ equals the total number of measurements for S11.

At S52, the processor 100 determines the next measurement point within the parameter space. The determination of the next measurement point may be similar to described above, e.g., using scores such as an acquisition function or the uncertainty map. For example, in some aspects of the disclosure, the processor 100 may determine the next measurement point based on the maximum/minimum uncertainty point (of the remaining points) in the parameter space. In some aspects of the disclosure, a different ξ, which balances the exploration and exploitation, may be used for training and subsequent analysis using the trained model. Additionally, a different acquisition function may be used for the training of the model and use of the model.

In other aspects of the disclosure, the user may know the value of the "Y" it desires as input and enters this known "Y" into the model to determine corresponding surface image patch for confirmation.

At S54, the processor 100 issues an instruction to the instrument 1A or 2 to obtain a measurement at the new measurement point (measurement data 7). The instruction is sent via the DAQ and respective interfaces 115, 10. The processor 100 may also display the next (new) measurement point on the display 120 to the user. In response, the instrument 1A or 2 acquires the measurement (e.g., spectral measurement) and transmits the measurement data 7 back to the processor 100 via the DAQ and respective interfaces 115, 10. The measurement data 7 may be stored in 105. In some aspects, the measurement data 7 (raw) may be displayed on the display 120. After acquiring the measurement data 7, the processor 100 determines the representation for the measurement at S56 and updates the uncertainty map. In an aspect of the disclosure, the uncertainly map may be displayed on display 120. A next measurement point is then determined from the updated uncertainty map (or based on an acquisition function). This may be repeated until ($M_{max}-M_{Training}$) measurements are taken (reaches $M_{max}$) for the experiment. Thus, the determination at S25 may be repeated. When the number of iterations is still less than the $M_{max}$, the process returns to S52 for the next measurement otherwise, the automated experiment ends.

In an aspect of the disclosure, the processor 100 uses a counter to track the number of iterations and increments the counter by one each iteration (training and post training).

In an aspect of the disclosure, once the model is trained using the surface image patches of a first size (structural image patch), the model may be able to predict the representations "y" corresponding to any image patch of any size. For example, to train the model, the surface image patches may be 8×8, however, one training, each surface image patch may be only a single pixel.

Example 1: HAADF-Stem

STEM may be used to probe phononic and plasmonic properties in nanoparticles by using high-energy resolution low-loss electron loss spectroscopy. Plasmon resonances are increasingly explored as a building block for quantum technologies, optical computing, and other nanophotonic applications. For many of these applications, strong confinement and guiding of light at nanometer scales is highly desirable. Localized resonances supported at material boundaries are a solution to control propagation and location of enhanced fields, but this is largely a materials concern and only a relatively small number of materials properties are known or hypothesized, consequently there exist many unexplored materials, in which edge plasmon activity is unknown.

In order to confirm that the above model may be universally used to determine material properties without prior knowledge, $MnPS_3$ crystals were grown using a chemical vapor transport (CVT) method. Single crystals were mechanically exfoliated directly onto Au Quantifoil TEM grids.

The same instrument, a NION Monochromatic Aberration Corrected STEM (MACSTEM), was used for both the HAADF image and the spectra image (EEL spectra). An accelerating voltage of 60 kV and probe semi-convergence angle of 30 mrad was used. EEL spectra were acquired using 100 ms dwell time per pixel while HAADF images were acquired with 16 μs per pixel.

The plasmonic behavior for a $MnPS_3$, a less-known layered 2D van der Waals antiferromagnet was studied and discovered. By analogy with other layered materials, the material system was hypothesized that it should demonstrate specific plasmonic behaviors in the vicinity of interfaces, e.g., develop edge plasmons. The physical criterion for edge plasmon detection is the presence of the peak in EELS spectrum below the bulk plasmon.

With $MnPS_3$, the source was not monochromatic due to the presence of higher energy excitations, giving a FWHM of 350 meV and nominal probe current of 200 pA, using a dispersion of 20 meV/ch.

$MnPS_3$ is rather sensitive to electron beam irradiation, making high-fidelity hyperspectral imaging difficult. This lends well to the paradigm of autonomous experiment which allows to only irradiate regions that are deemed to be of interest, limiting the total dose the specimen receives.

The electron probe position, EELS camera, and Ronchigram camera were accessible with appropriate commands via Python scripting interface.

A representation of the measurement was a peak ratio of the EEL spectra, e.g., optimize a peak ratio in the EEL spectrum where it was posit the existence of a low energy electronic feature as well as a higher energy bulk plasmon resonance. The EEL spectra predicted from the structural descriptors were fit with two Lorentzian functions whose peak positions can fluctuate in energy but not overlap. The ratio of the amplitudes of the two were then used as the guiding principle in the autonomous experiment, where the experiment sought to maximize the low energy feature and simultaneously minimize the bulk plasmon.

Training was done on the microscope hardware PC (via the Python packages). A processor, such as a CPU or GPU may be used for training. For vector representations and predictions (i.e., full spectrum prediction), use of GPU may be required due to needed parallelization of many spectral targets.

Autonomous experiment began with the collection of HAADF (structural) image of size m×n pixels, followed by N number of randomly sampled EEL spectra in the same space, where here m×n was 50×50 and N was three; however, other number of seed points may have been used instead.

The probe is then immediately moved to a pre-defined safe location (e.g., for beam sensitive samples) or is blanked to avoid damage to the sample. Image patches (features) were created for all pixels in the HAADF using a user-specified structural image patch, such as 8×8 pixels. The size of the structural image patch may be selected based on field of view and structural details that may be contained in each surface image patch.

The model was not pre-trained prior to the EEL spectra-seed point acquisition. No sample information was supplied to guide or otherwise assist in the performance of the automated experiment.

Figure 6A:
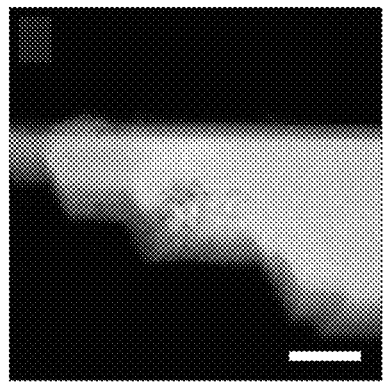
FIGS. 6A-6D illustrate an example of results of an automated scanning transmission electron microscope system in accordance with aspects of the disclosure, where

FIG. 6A illustrates the HAADF image itself (the divided surface image patches are not specifically shown).

Figure 6B:
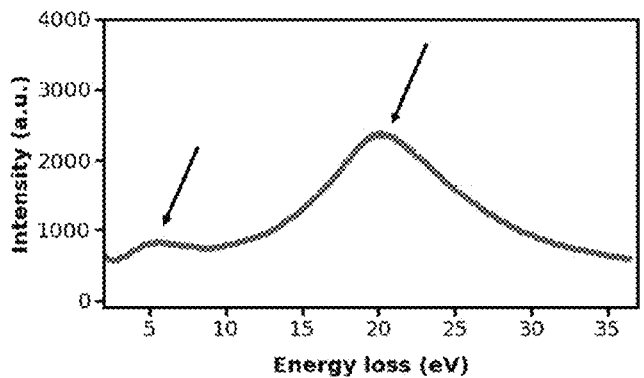
Figure 6C:
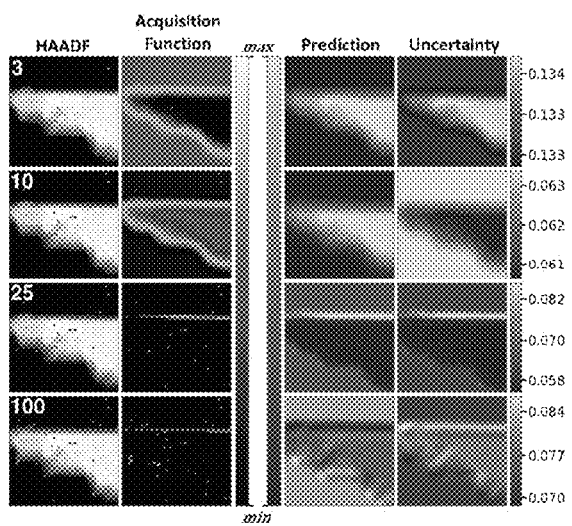

In FIG. 6C, the points (patches) for the EEL spectra measurement are superposed on the HAADF (small dots). There are four rows of images based on four different numbers of spectra measurement points. The top row had 3 measurement points, the second row had 10 measurement points, the third row had 25 measurement points and the last row had 100. Next to the superposed HAADF images are the corresponding acquisition function (which was an EI), prediction (predictive mean) and uncertainty. The images are for the peak ratio optimization.

The acquisition function effectively combines the knowledge of the prediction with minimizing the uncertainty. Fairly quickly, the model described herein recognized the relationship between the boundary of the flake and vacuum, in which a strong localized edge plasmon is found to exist and the higher energy bulk plasmon is weak or non-existent. As can be seen in FIG. 6C, the top edge is more favorable than other edges presumably due to a sharper boundary. FIG. 6C shows that after measuring between 10 and 25 EEL spectra (which corresponds to only 1% of the entire parameter space), the model predicts the location of edge modes rather well. This means that after only a fraction of points are initially sampled, the model either need not be trained further or not as frequently, allowing a substantial speed increase.

FIG. 6B illustrates the average spectrum from all measured points in FIG. 6C with the arrows indicating the peaks which were used to determine the peak ratios. The maximum spectral intensity is near 20 eV.

Figure 6D:
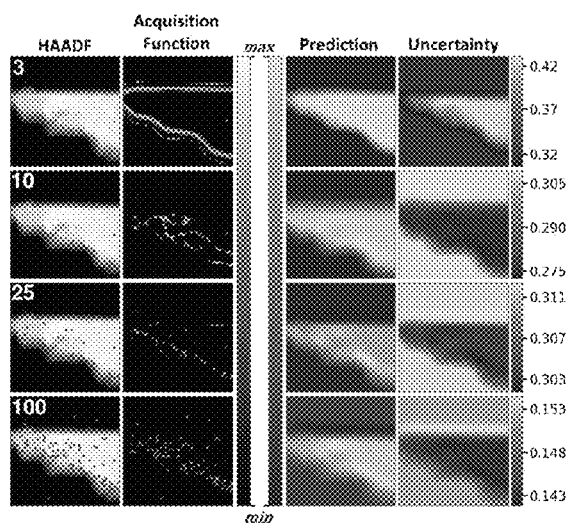

It is noted that the representation of the measurements may impact the discovery pathway, e.g., next measurement point(s). To illustrate this, the representation was changed from peak ratio to maximum peak intensity as is shown in FIG. 6D. In this case, the maximum peak intensity appears to correspond to the bulk plasmon resonance, which generally increases in strength with thickness. As expected, since the intensity in the HAADF can be treated as a measurement of relative thickness, at these scales, pathway preponderantly explores the regions on the flake. This second representation serves to support the fact that this autonomous experiment enabled by the model indeed does search for physics that depends on the built-in models that are provided. Comparing the two pathways in FIGS. 6C and 6D, a different number of acquired points are needed to satisfactorily learn the structure-property relationships. Also, as can be seen from the acquisition function, there are dramatic differences in the measurement points.

The automated experiment was stopped after the acquisition of 100 points in both pathways for demonstration and comparison purposes, however, the same number of measurements are not required or needed.

As shown in FIGS. 6A-6D, the model was able to detect the edge plasmon behavior in the 2D layered antiferromagnet $MnPS_3$ without prior knowledge of the same for this material but rather using the surface/structural image patches as the initial data and active learning to build the structural-property relationships. The approach described herein is not limited to certain material systems-on the contrary, any material that can be placed in the microscope can be used without any prior knowledge of the material system. The autonomous experimentation can be readily extended beyond the spectral measurements such as EELS and EDS.

Example 2: 4D-Stem

The automated experiments in 4D Scanning Transmission Electron Microscopy were implemented for rapid discovery of local structures, symmetry-breaking distortions, and internal electric and magnetic fields in complex materials.

Here, scalar-derived quantities such as lattice parameters, strain, and electric fields that are calculated from a diffraction pattern, along with their uncertainties, can be used as a part of the exploration criteria.

A twisted bilayer graphene (TBG) was used in this automatic experiment. TBG is host to a gamut of interesting physical behaviors, many of which depend on the relative twist angle between the two layers—a part of the field of twistronics. For example, the so-called twisted bilayer "magic angle" graphene displays superconductivity as a result of the flat band topology caused from the modification of the potential energy landscape. Edges, holes, and other defects in both graphene and TBG are expected to affect the twist behaviors, and hence potentially control these behaviors locally. The electron beam in the STEM, however, can alter or destroy the defects, even below the knock-on damage threshold for graphene due to a lower binding energy at edges or defects or the presence of a second layer in bilayer graphene. Consequently, with TBG, capturing a 4D-STEM or STEM-EELS dataset causes the sample to often change during the acquisition—in other words, it is highly dose sensitive. Aside from dose sensitivity, collection of high quality 4D data is limited to small, nanometer sized regions;

sampling large regions is prohibitive since it is costly to obtain high quality data over large fields of view.

By using the techniques described herein, efficient, and "intelligent" probing of dissimilar structural elements to discover desired physical functionality is made possible without damaging the sample. This is because a) between training steps, the specimen is blocked from electron irradiation, and b) a small fraction of the total number of available points are ever visited.

Graphene was grown on Cu foil using atmospheric pressure chemical vapor deposition (AP-CVD) Poly (methyl methacrylate) (PMMA) was spin coated on the surface to form a mechanical stabilizer. The Cu foil was etched away in a bath of deionized water (DI) and ammonium persulfate. The PMMA/graphene stack was rinsed in DI water and caught on a Protochips heater chip. The chip was then baked at 150 C on a hot plate for 15 mins before being immersed in acetone for 15 mins to dissolve the PMMA. Upon removal from the acetone, the chip was dipped in isopropyl alcohol and allowed to dry.

Electron microscopy was carried out using a NION 5th order aberration corrected scanning transmission electron microscope (NION UltraSTEM100), with an accelerating voltage of 70 kV and a nominal probe current of 30 pA. A semiconvergence angle of 30 mrad was selected for CoM and virtual aperture experiments. A CMOS detector was used. Pixel dwell times between 2 and 250 ms were used, depending on type of experiment. All specimens were heated to 160° C. in high vacuum overnight prior to inserting into the microscope.

Automated experiment was done on the microscope hardware PC (via the Python packages) with the NION Swift control interface.

In 4D-STEM, each measurement is a 2D diffraction pattern, therefore the diffraction pattern must be reduced to a single quantity, i.e., it must be scalarized (representation). The representation may be a CoM that reduces the 2D image to a single vector, whose components can then be used as the measured property. For example, the CoM may be scalarized into, four quantities—the x component, y component, angle, and magnitude. However, the scalarization (or defining behavior of interest) can be based on more complex analyses, including physics-based inversions of the 4D-STEM data towards the scattering potential, and selecting associated features of interest.

4D STEM diffraction data are linked to a small patch (as described above surface or structure(al) image patches) in the structural image space of size D centered at the spatial coordinate from where they are acquired. D equaled 12 in the experiment. In this way, the image patch size may be varied to explore the connection between the derived functional response and its localization in real space such as based on the field of view, image resolution, characteristic length scale of the phenomenon of interest, etc.

Figure 7B:
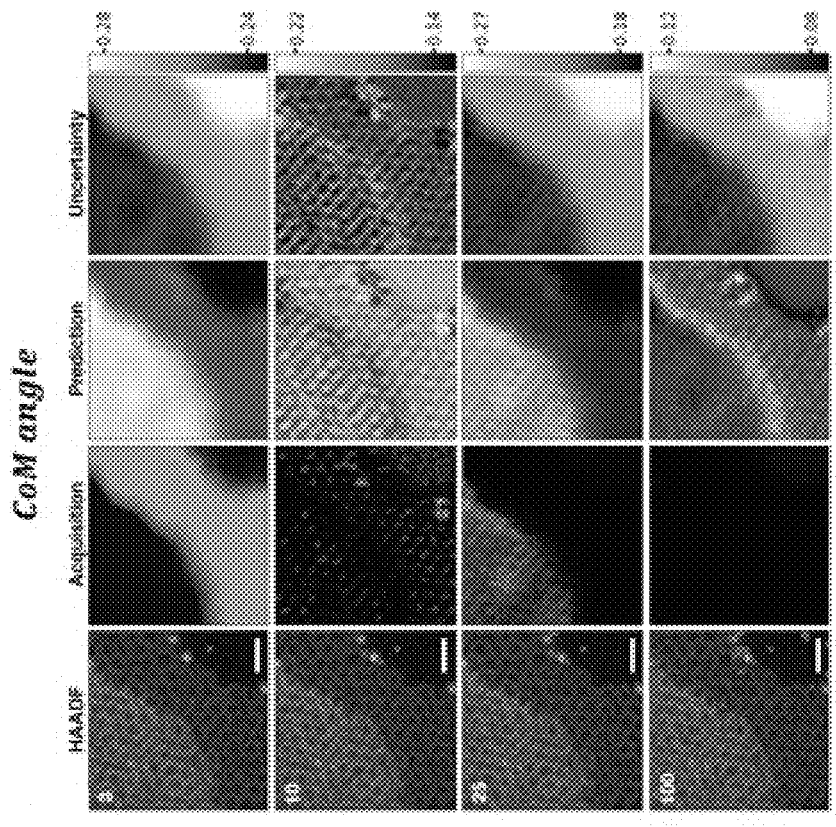
FIGS. 7A and 7B illustrate example of results of an automated 4D-scanning transmission microscope system in accordance with aspects of the disclosure with different scalarized values (representations), where
Figure 7A:
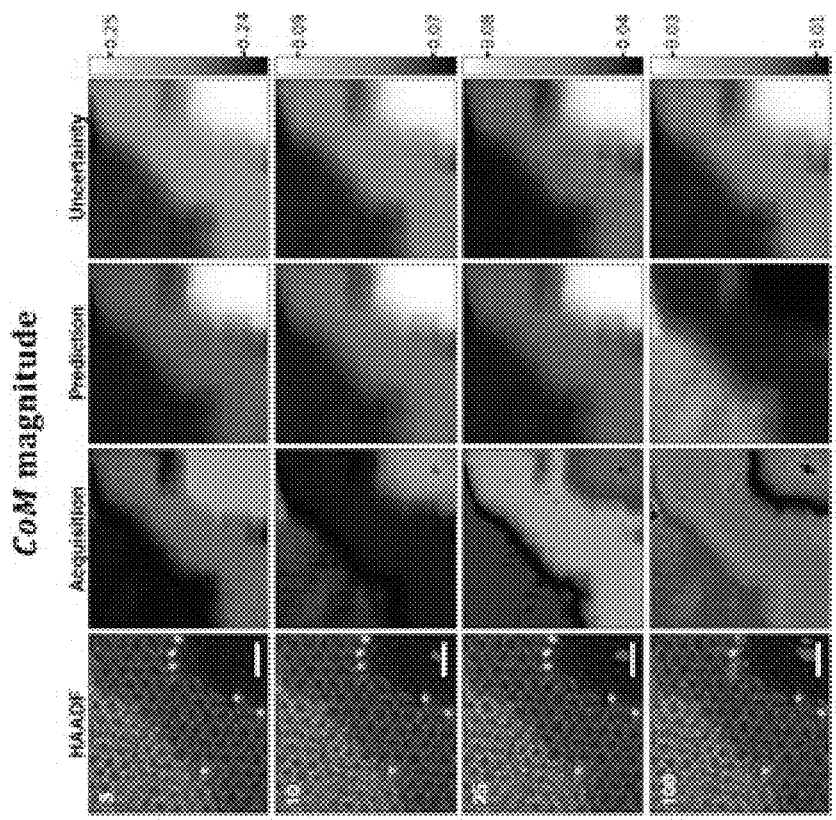

FIGS. 7A and 7B illustrate the results of the automated 4D-scanning transmission microscope experiment using the NION UltraSTEM100 microscope. FIG. 7A shows a CoM magnitude as the representation and FIG. 7B shows a CoM angle as the representation.

Each figure shows four different numbers of acquisition points for the measurements, i.e., 2D diffraction pattern (different number of measurement patches). The top row had 3 measurements, the second row had 10 measurements, the third row had 25 measurements sand the fourth row had 100 measurements. The HAADF image (optical image) is shown in each row. The measurement points are superposed on the HAADF image (small red dots). For each row, the prediction (predictive mean) and uncertainty and acquisition function are shown. EI was used as the acquisition function. See EQ. 10.

Using the CoM magnitude as a scalarizer (representation), the search was autonomously done for regions in the HAADF that cause the strongest deflection of the beam, e.g., the strongest relative electric fields. While the CoM angle is simply the angular component of the CoM vector, it nevertheless reveals interesting phenomena in the predictions and therefore is also shown for comparison.

The full HAADF image was acquired before collecting any 4D data such that model had access to the entire structural image space for training and subsequent testing.

Each automated experiment was performed using the same region but is not identical because the beam has induced defect formation between experiments. Despite operating at 70 kV which is below the knock-on threshold for graphene, defects and edges require substantially less energy to disrupt their bonds. A different accelerating voltage may be used.

As can be seen from FIGS. 7A and 7B, relative field strengths are predicted reasonably well, albeit with high uncertainty, with only a handful of measurements is striking. The field strength should in principle be strongest surrounding dopants or within thicker material where more charge is accumulated. The model was able to learn a relationship between electric field and structure. Importantly, the model established the relationship very quickly and only with a small number of data points-indeed, even the 100 data points that were measured over the entire experiment account for 1% of the total data space. This demonstrates the power of the model where it is not pre-training, but rather trained on the fly and therefore can be applied to practically any material system, especially where the material is affected by the acquisition.

Uncertainties existed within the holes (vacuum) for both scalarizers (CoM Magnitude and angle). This is expected behavior, and the model attempts to minimize the uncertainty there by biasing subsequent measurements to be collected from nearby or within the holes, which is observed in several of the acquisition functions by the brighter contrast near or in holes.

Also as expected, there are different pathways arising from the different scalarizers (CoM Magnitude and angle), e.g., order of points of acquisition of the measurements and points of acquisition. For these two scalarizers, the difference was dramatic. The CoM magnitude is directly related to the in-plane electric field strength of the material—the early predictions in FIG. 7A reflect that this should occur most strongly in the hole; at the same time however, the uncertainty is greatest here. The uncertainty was slowly reduced by continually visiting regions of high uncertainty (within the hole) until which point the model learns that despite the presence of a hole, the field strength, should, be stronger surrounding dopant atoms or on bilayer regions.

When the CoM angle was used as the representation as shown in FIG. 7B, the prediction and exploration pathway start to take on a different form, and the former even exhibits atomic contrast. Near the final step, the prediction shows features surrounding dopant atoms as well as a distinct boundary between bilayer and single layer graphene, all of which is found by considering the direction of the CoM shift instead of its magnitude. This counterintuitive result shows the power of the model-based automated experiments and begins to uncover phenomena that are not observed in ground truth data nor would necessarily be expected. Advantageously, the disclosed machine learning considers the combined knowledge of the structural data with the scalar quantity (such as derived from the diffraction data)—these are almost always considered separately but rarely together.

Figures 8A, 8B:
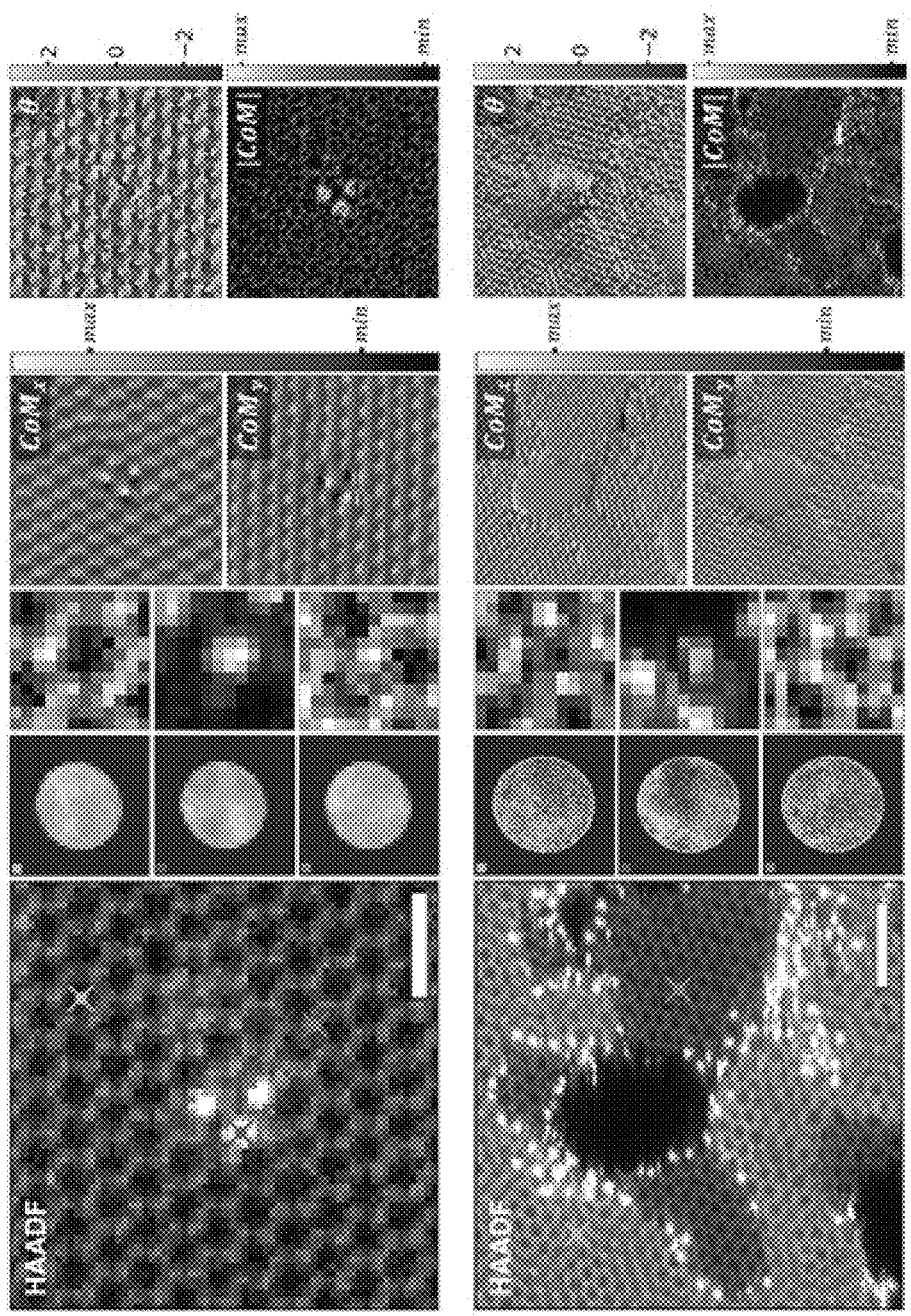
FIGS. 8A and 8B illustrate a ground truth of measurements in a 4D-scanning transmission microscope system, where

A second experiment was performed to show the power of methods described herein. FIGS. 8A and 8B show two ground truth 4D datasets of single (FIG. 8A) and bilayer graphene (FIG. 8B) in which the diffraction patterns are recorded. Both materials contained defects.

In each of FIGS. 8A and 8B, three ronchigrams and corresponding surface image patches are shown (local image patches). The points of the acquisition are superposed on the HAADF image. The points are shown with a red, yellow, or blue X. The specific ronchigram is also identified by red, yellow, or blue corresponding to the colored X. The ronchigram was acquired at the center of the structural image patch. Some differences in contrast among the local diffraction patterns may be discernible by eye, but in no way is the physical meaning of these differences obvious.

The Convergent-beam electron diffraction (CBED) was converted into the CoM-based scalar representations, $CoM_x$, $CoM_y$, angle, and magnitude. HAADF scale bars 0.5 nm and 2 nm, θ in units of radians. With each diffraction pattern, the center of mass (CoM) of the central beam is calculated which, by relative CoM shifts, is used to compute the local electric field and related quantities such as charge density and electric potential at the sample.

The CoM shift, relative to a vacuum reference, was calculated for all spatial positions and the vector components and magnitude are all shown. The most apparent result was that the CoM magnitude is strongest surrounding dopant atoms, which are higher in atomic number and therefore exhibit a stronger atomic electric field and influence on the beam. The AA stacking sites in the bilayer graphene are also recognizable from the CoM magnitude contrast.

The methods described herein was applied to the data sets to compare the prediction and uncertainty and the ground truth. The magnitude representation was used. The "measured" data points was randomly sampled or selected (even though in the disclosed methods the data points are not randomly selected (other than seed points) but are determined from the acquisition function as a true active learning). In other words, the points in this experiment were not optimally chosen to maximize the cumulative knowledge the model acquires.

Figures 9A, 9B:
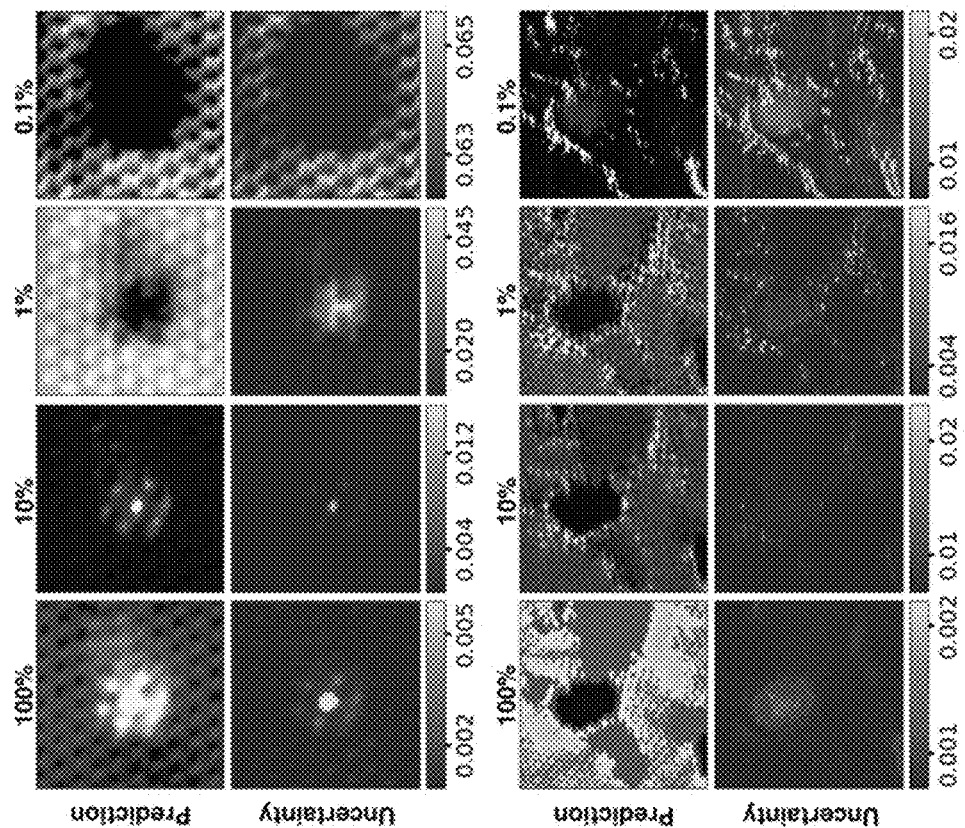
FIG. 9A illustrates prediction and uncertainty maps for different number of measurements for the CoM magnitude representation in accordance with aspects of the disclosure for FIG. 8A.
FIG. 9B illustrates prediction and uncertainty maps for different number of measurements for the CoM magnitude representation in accordance with aspects of the disclosure for FIG. 8B.

FIGS. 9A and 9B show the prediction and uncertainty for different numbers of measurements for the single layer graphene (FIG. 9A) and the twisted bilayer graphene (FIG. 9B). As can be seen, representation of the CoM magnitude was achieved with very few numbers of measurements, even less than 1% of the total space provided reasonable predictions with small uncertainties, implying that the relationship between HAADF structure and CoM magnitude was realized rather quickly. With an increasing number of measurements, the primary difference in predictions begins to be deviations in local contrast but the same features are still present—FIG. 9B illustrates this behavior well when comparing 100% to 10% and 1% measurements.

Example 3: Automated Piezoresponse Force Microscopy (PFM) and Spectroscopy

Emergent functionalities of structural and topological defects in ferroelectric materials underpin an extremely broad spectrum of applications ranging from domain wall electronics to high dielectric and electromechanical responses. The automated PFM actively discovers relationships between local domain structure and polarization switching characteristics in ferroelectric materials encoded in the hysteresis loop (measurement). The measurement may be scalarized into nucleation bias, coercive bias, hysteresis loop area, or more complex functionals of hysteresis loop shape and corresponding uncertainties are used to guide the discovery.

The Lead titanate ($PbTiO_3$) film was grown by chemical vapor deposition on a $SrRuO_3$ bottom electrode on a $KTaO_3$ substrate.

The PFM was performed using an Oxford Instrument Asylum Research Cypher microscope with Budget Sensor Multi75E-G Cr/Pt coated AFM probes (~3 N/m). Band excitation data are acquired with a National Instruments DAQ card and chassis operated with a LabView framework.

Figure 10A:
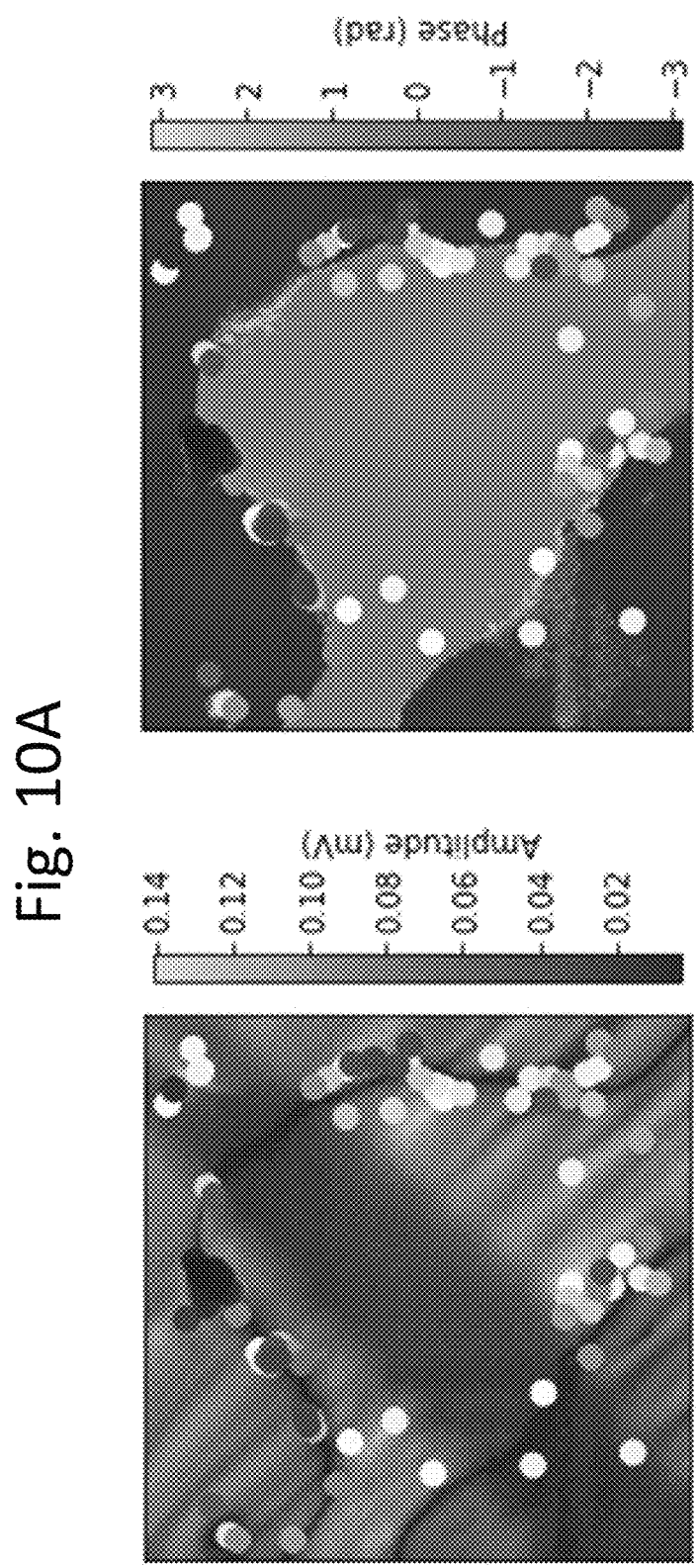

The data was processed (training) and testing (predictions) used a CPU (such as a notebook). The CPU together with an in-house Lab View-based script for National Instruments hardware (LabView-NI) controlled the tip position for BEPS waveform generation and data acquisition. A BEPFM measurement was performed to acquire the domain structure image. The BEPFM amplitude and phase images for on-field are shown in FIG. 10A and off-field shown in FIG. 11A. The PTO film contains both in-plane a domains and out-of-plane c domains. These images were 256×256. The images were divided into domain structure image patches (surface image patches). The size of the patches was 20×20.

The seed points were randomly determined within the images to acquire the hysteresis loop, e.g., BEPS measurement. The model was trained initially using the data from the seed points and the pre-acquiring corresponding domain structure image patch. The model was trained for 200 iterations after which a prediction on all the domain structure image patches was made and the acquisition function was used to derive the next location for hysteresis measurement to LabView-NI. Then the process is repeated.

The selected 200 acquisition points for each path (on-field v. off field) are superposed on the BEPFM amplitude and phase images (FIGS. 10A and 11A). Shown in red dots.

Interestingly, the measurement points for on-field hysteresis loop area are concentrated around $c^-/c^+$ ferroelectric domain walls (see FIG. 10A), while the measurement points for off-field hysteresis loop area are concentrated around a/c ferroelastic domain walls (see FIG. 11A), demonstrating the potential of this approach to discover different behaviors based on predefined exploration targets. As can be seen, there are different exploration path and sampled points when the method is guided by on-field and off-field hysteresis loops, indicating structure-hysteresis relationship varies under different circumstances, i.e., on-field or off-field. This is an indicative of the different properties included in the on-field and off-field hysteresis loops.

Figure 10B:
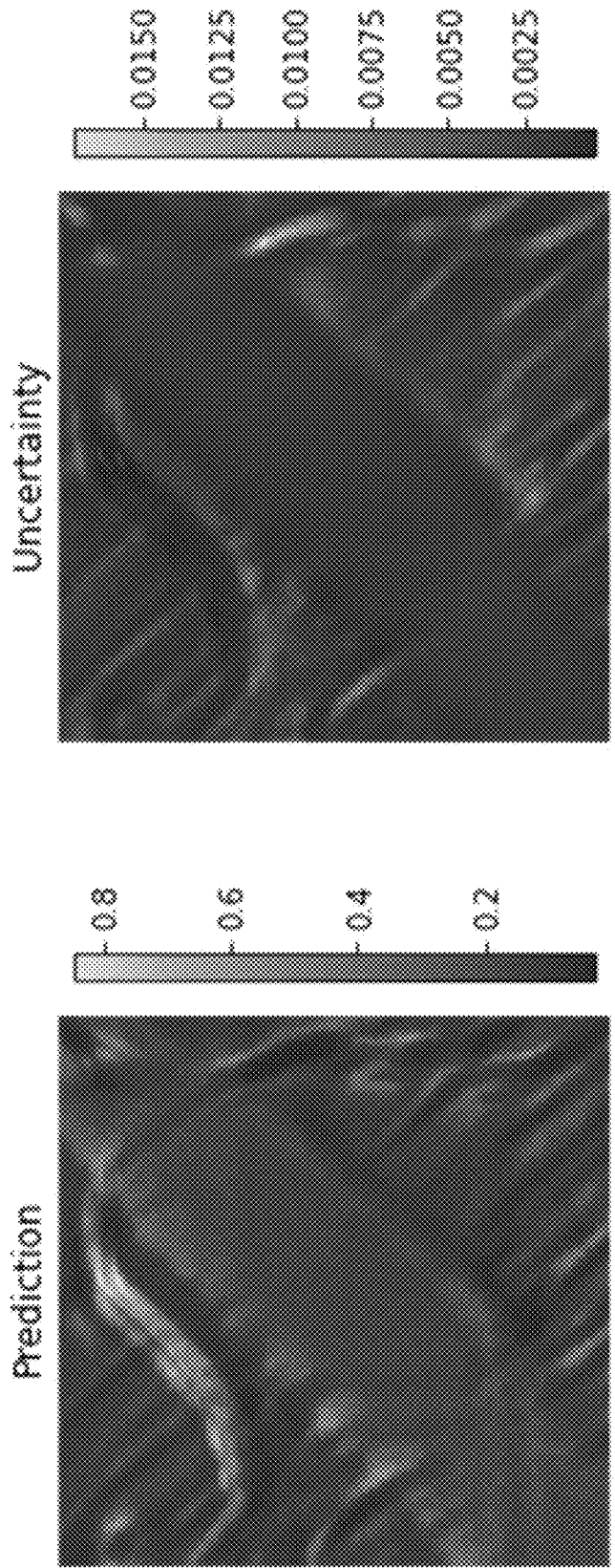
FIG. 10B illustrates the prediction and uncertainty of the on-field loop area based on an acquired 200 hysteresis loops and where
Figure 11B:
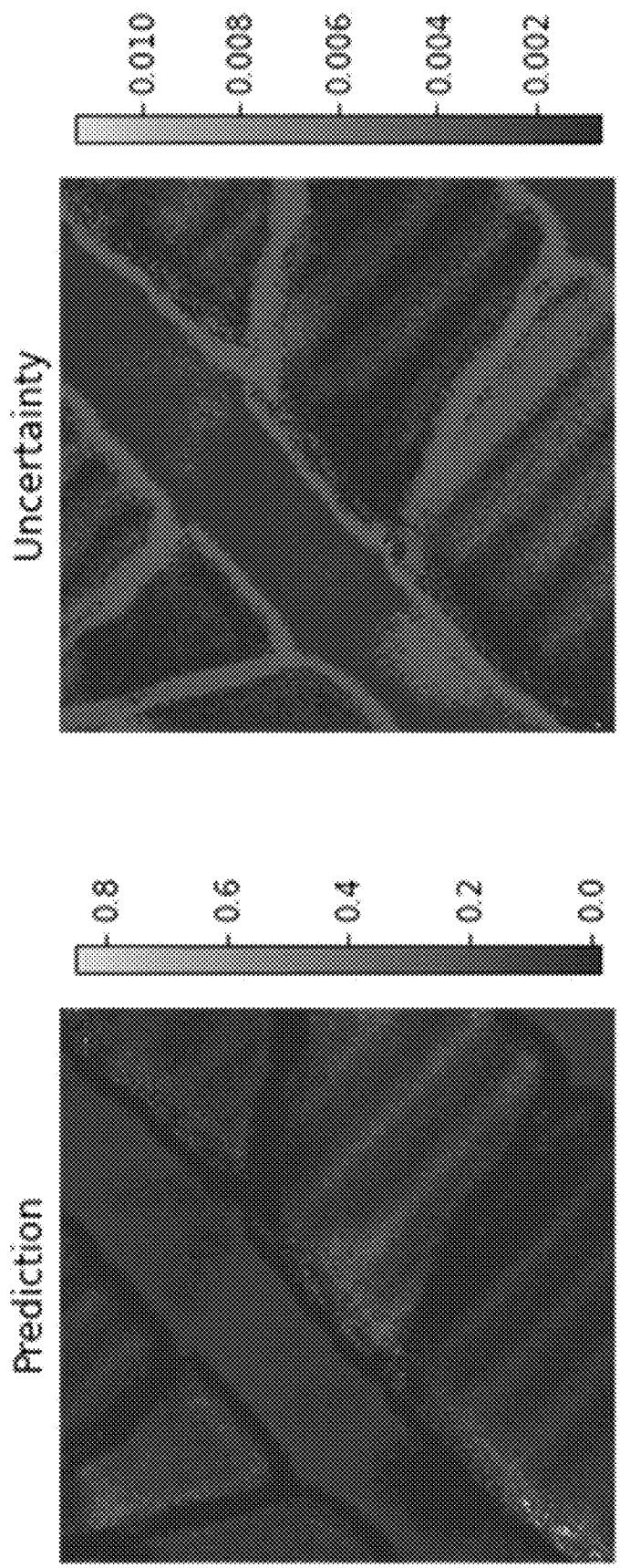

After the 200 measurements, the model was used to predicts the hysteresis loop area map for all the remaining patches (on-field and off field). FIGS. 10B and 11B show the prediction maps for the on-field loop area (FIG. 10B) and the off-field loop area (FIG. 11B).

The corresponding uncertainty maps are shown. The domain structures are visible in the predicted loop area maps, indicating the hysteresis loop is associated with the domain structure. The larger polarization mobility in the vicinity of the 180 walls results in more significant hysteresis loop opening in the on-field measurements. At the same time, the off-field measurements detect only the slowly relaxing (on the measurement time scale) components, indicative of the stronger pinning at the ferroelastic walls.

Not only are there differences in the discovery pathway for on-field v. off-field hysteresis loop areas, but there are also differences in the discovery pathway for different scalarized representations of the hysteresis loop. FIG. 12A illustrates an example of a hysteresis loop and definition of possible representations thereof: $A_{loop}$: loop area; $W_{loop}$: loop width; $-E_c$: negative coercive field; $+E_c$: positive coercive field; $-V_n$: negative nucleation bias; $+V_n$: positive nucleation bias.

FIGS. 12B and 12C highlight the difference in the exploratory pathways for two representative representations of the hysteresis loop: loop area (FIG. 12B) and loop width (FIG. 12C). The red dots are the measurement points, and the dashed line shows the pathway. The measurement points in the example are only 0.5% of the total available points. The measurement points are superposed on a polarization image (e.g., loop area and loop width, respectively.

The measurement points were determined using an acquisition function.

As can be seen from FIGS. 12D and 12E, the model is able to predict the area and width using only less than 10% of the measurement (comparing the ground truth to the image of the 10% measurement).

Provisional application Ser. No. 63/346,425 describes and illustrates other examples. This description is incorporated by reference herein.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for machine learning-driven operation of instrumentation with human in the loop, the system comprising:
 a communication interface configured to
  transmit instructions to a first instrument to acquire measurements of a physical characteristic of a sample, and receive from the first instrument corresponding physical-characteristic measurements, and
  transmit instructions to a second instrument to scan a surface of the sample, and receive from the second instrument an image corresponding to the scanned sample surface;
 a processor configured to
  (a) access the image received through the communication interface;
  (b) produce M×N patches of the image corresponding to non-overlapping locations of the sample surface, each image patch having m×n pixels and showing corresponding local features of the sample-surface structure;
  (c) instruct the first instrument to acquire physical-characteristic measurements at sample-surface locations to which K of the M×N image patches correspond, where K<<M×N, and access the respective physical-characteristic measurements received through the communication interface;
  (d) convert the physical-characteristic measurements corresponding to the K image patches into representations of the measurements;
  (e) train a model to determine a relationship between the local features of the sample-surface structure shown in the K image patches and the measurement representations, wherein the processor is configured to perform K iterations of a training loop (c)-(e), each iteration associated with a pair of one of the K image patches and its corresponding measurement representation;
  (f) predict, based on the trained model, representations of physical-characteristic measurements to be acquired at the sample-surface locations to which the remaining (M×N−K) image patches correspond, and estimate respective prediction uncertainties;
  (g) select, based on an acquisition function associated with at least the prediction uncertainties, one of the remaining image patches corresponding to a sample-surface location for acquiring the next physical-characteristic measurement;
  (h) instruct the first instrument to acquire the next physical-characteristic measurement at the sample-surface location to which the selected image patch corresponds, and access the acquired physical-characteristic measurement through the communication interface;
  (i) convert the acquired physical-characteristic measurement into a representation thereof in association with the selected image patch; and (j) retrain the model using the selected image patch and its associated measurement representation, wherein the processor is configured to iteratively perform a retraining loop (f)-(j) until reaching a training threshold; and a user interface configured to receive one or more of
a respective selection input that, when provided by a user before the processor performs each of the K iterations of the training loop (c)-(e), identifies a respective image patch corresponding to the sample-surface location for acquiring the associated physical-characteristic measurement, a reinforcement input that, when provided by a user after the processor performs one of the K iterations of the training loop (c)-(e), causes the processor to reinforce a result of the conversion of the associated physical-characteristic measurement into its corresponding measurement representation, or an adjustment input that, when provided by the user after the processor performs one of the iterations of the retraining loop (f)-(j), causes the processor to change the basis of the selection of one of the remaining image patches corresponding to the sample-surface location for acquiring the next physical-characteristic measurement from a first acquisition function to a second acquisition function.

2. The system of claim 1, wherein the first acquisition function and the second acquisition function are selected from a group consisting of an upper confident bound (UCB), a probability of improvement (PI) and an expected improvement (EI).

3. The system of claim 1, wherein the processor is configured to, in (e),
jointly determine a plurality of first model parameters and at least one second model parameter that define a physical-to-structural correlation between the image patches and the representations of the measurements, where the plurality of first model parameters are used to determine Z latent variables for each image patch, where Z<<m×n, the plurality of first model parameters and the at least one second model parameter are initially determined from a first image patch of the K image patches and a corresponding representation of the measurement, and iteratively updated based on progressively larger subsets of the K image patches and their corresponding measurement representations.

4. The system of claim 3, wherein the processor is configured to, in (f)
for each of the remaining (M×N−K) image patches, use the plurality of first model parameters to predict the latent variables for the respective image patch and use the at least one second model parameter and the predicted latent variables to predict the corresponding representation.

5. The system of claim 1, wherein the training threshold comprises at least one of a decrease in a prediction uncertainty between iterations being at a rate below a predetermined rate or a total number of measurements exceeds a predetermined number $N_{Max}$, where $N_{Max}<M\times N$.

6. The system of claim 5, wherein when the training threshold is reached, the processor is configured to determine whether the predetermined number $N_{Max}$ is reached and in response to determining that the predetermined number $N_{Max}$ is not reached, the processor is configured to instruct the first instrument to acquire additional measurements using the trained model at certain remaining points and at a defined order determined from the trained model.

7. The system of claim 1, wherein the first instrument and the second instrument are the same instrument.

8. The system of claim 1, further comprising the first instrument and the second instrument and at least one data acquisition device.

9. The system of claim 1, wherein the first instrument or the second instrument is selected from a group consisting of: a scanning tunnelling microscope (STM), scanning probe microscope (SPM), scanning electron microscope (SEM), transmission electron microscope (TEM), scanning transmission electron microscope (STEM) and piezoresponse force microscope (PFM).

10. The system of claim 1, wherein the second instrument is a STEM and the image is a is a high-angle annular dark-field (HAADF) image,
the physical characteristic of the sample surface is related to plasmon functionalities, and the first instrument is configured to measure an electron energy loss spectra (EELS), and
the representation of the EELS is one of a ratio of a low-energy peak's amplitude to a high-energy peak's amplitude, or maximum amplitude of the high-energy peak.

11. The system of claim 1, wherein the second instrument is a STEM and the image is a high-angle annular dark-field (HAADF) image,
the physical characteristic of the sample surface is related to one of electric field strength, charge density, or lattice strain, and the first instrument is configured to measure 2D diffraction patterns, and
the representation of the 2D diffraction patterns is one of a x- or y-components of center of mass (CoM), CoM angle, or CoM magnitude.

12. The system of claim 1, wherein the second instrument is a piezoresponse force microscope (PFM) and
the image is a PFM image,
the physical characteristic of the sample surface is related to interactions of ferroelectric and ferroelastic domain walls, and the first instrument is configured to measure are hysteresis loops, and
the representation of the hysteresis loops is one of a hysteresis-loop width or a hysteresis-loop area.

* * * * *